US012699681B2

(12) United States Patent
Jana et al.

(10) Patent No.: US 12,699,681 B2
(45) Date of Patent: Aug. 4, 2026

(54) CLOUD DATA REWRITES USING DEDUPLICATION

(71) Applicant: Rubrik, Inc., Palo Alto, CA (US)

(72) Inventors: Sayantan Jana, Palo Alto, CA (US); Yashashavi Momyan, Bengaluru (IN); Amit Kundlia, Bengaluru (IN)

(73) Assignee: Rubrik, Inc., Palo Alto, CA (US)

( * ) Notice: Subject to any disclaimer, the term of this patent is extended or adjusted under 35 U.S.C. 154(b) by 0 days.

(21) Appl. No.: 19/019,013

(22) Filed: Jan. 13, 2025

(65) Prior Publication Data

US 2026/0203259 A1    Jul. 16, 2026

(51) Int. Cl.
*G06F 16/00* (2019.01)
*G06F 16/215* (2019.01)

(52) U.S. Cl.
CPC ................................. *G06F 16/215* (2019.01)

(58) Field of Classification Search
None
See application file for complete search history.

(56) References Cited

U.S. PATENT DOCUMENTS

| | | | | |
|---|---|---|---|---|
| 11,500,664 B2 * | 11/2022 | Meadowcroft | ..... | G06F 11/2097 |
| 11,681,586 B2 * | 6/2023 | Terei | ..................... | G06F 16/128 |
| | | | | 707/692 |
| 2019/0129739 A1 * | 5/2019 | Al Reza | .............. | G06F 11/3051 |
| 2025/0181260 A1 * | 6/2025 | Tagra | .................. | G06F 9/45558 |

* cited by examiner

*Primary Examiner* — Bai D Vu
(74) *Attorney, Agent, or Firm* — Holland & Hart LLP

(57) ABSTRACT

Methods, systems, and devices for data management are described. A data management system (DMS) may identify two snapshots from two different snapshot chains and rewrite one of the snapshots as a cross-incremental snapshot over the other snapshot that includes differential data relative to the other snapshot. Based on rewriting the snapshot as the cross-incremental snapshot, the DMS may reduce the amount of storage space used by the snapshot chain of the cross-incremental snapshot (as cross-incremental snapshots may use less space than base snapshots). In some examples, the DMS may identify which snapshots to rewrite as cross-incremental snapshots based on one or more parameters. For example, the one or more parameters may include respective snapshot expiration times for each of the snapshot chains.

20 Claims, 9 Drawing Sheets

200

Base Snapshot

Cross-Incremental Snapshot

Incremental Snapshot

200

Figure 8:
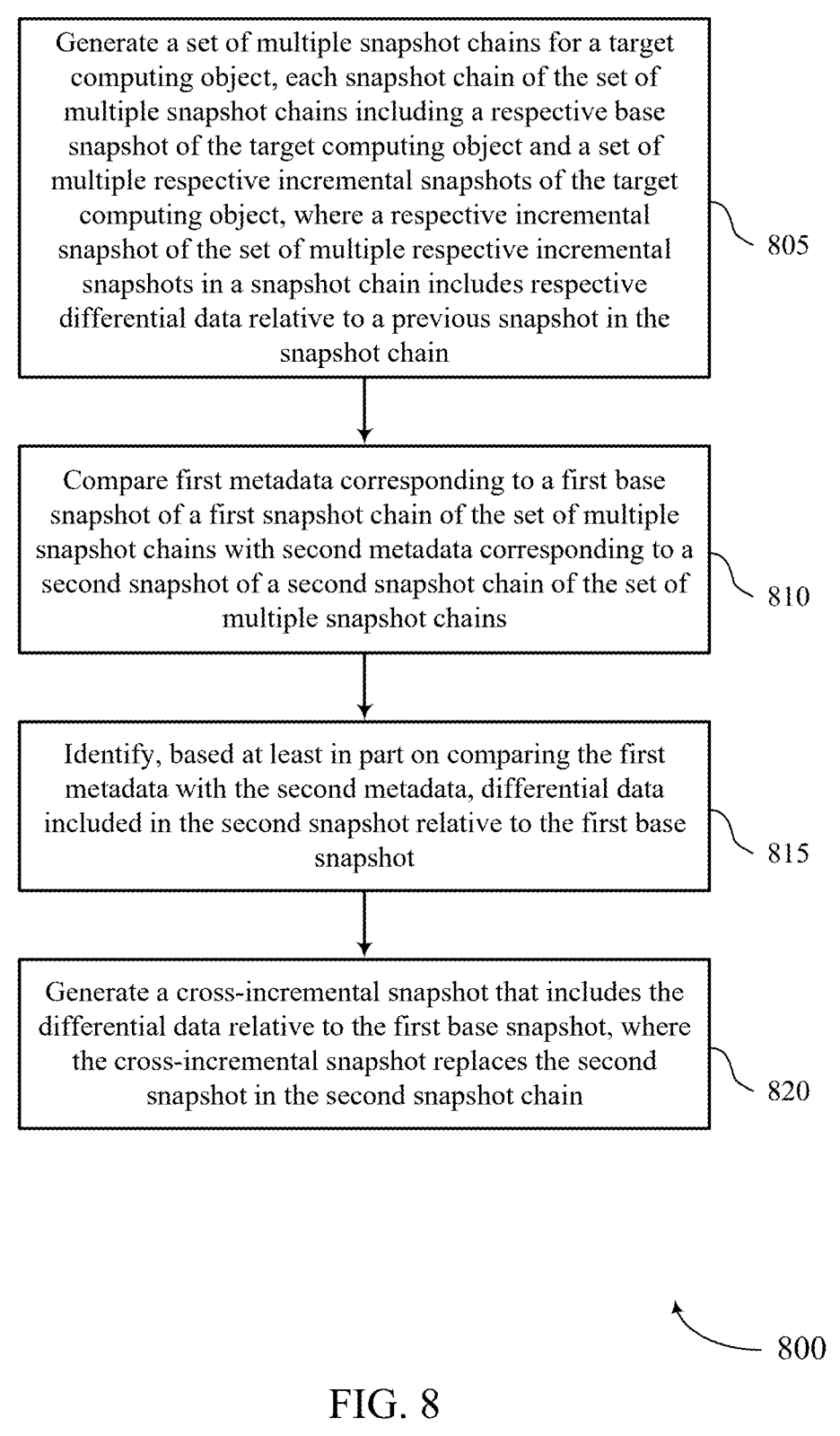

Generate a set of multiple snapshot chains for a target computing object, each snapshot chain of the set of multiple snapshot chains including a respective base snapshot of the target computing object and a set of multiple respective incremental snapshots of the target computing object, where a respective incremental snapshot of the set of multiple respective incremental snapshots in a snapshot chain includes respective differential data relative to a previous snapshot in the snapshot chain

805

Compare first metadata corresponding to a first base snapshot of a first snapshot chain of the set of multiple snapshot chains with second metadata corresponding to a second snapshot of a second snapshot chain of the set of multiple snapshot chains

810

Identify, based at least in part on comparing the first metadata with the second metadata, differential data included in the second snapshot relative to the first base snapshot

815

Generate a cross-incremental snapshot that includes the differential data relative to the first base snapshot, where the cross-incremental snapshot replaces the second snapshot in the second snapshot chain

Figure 9:
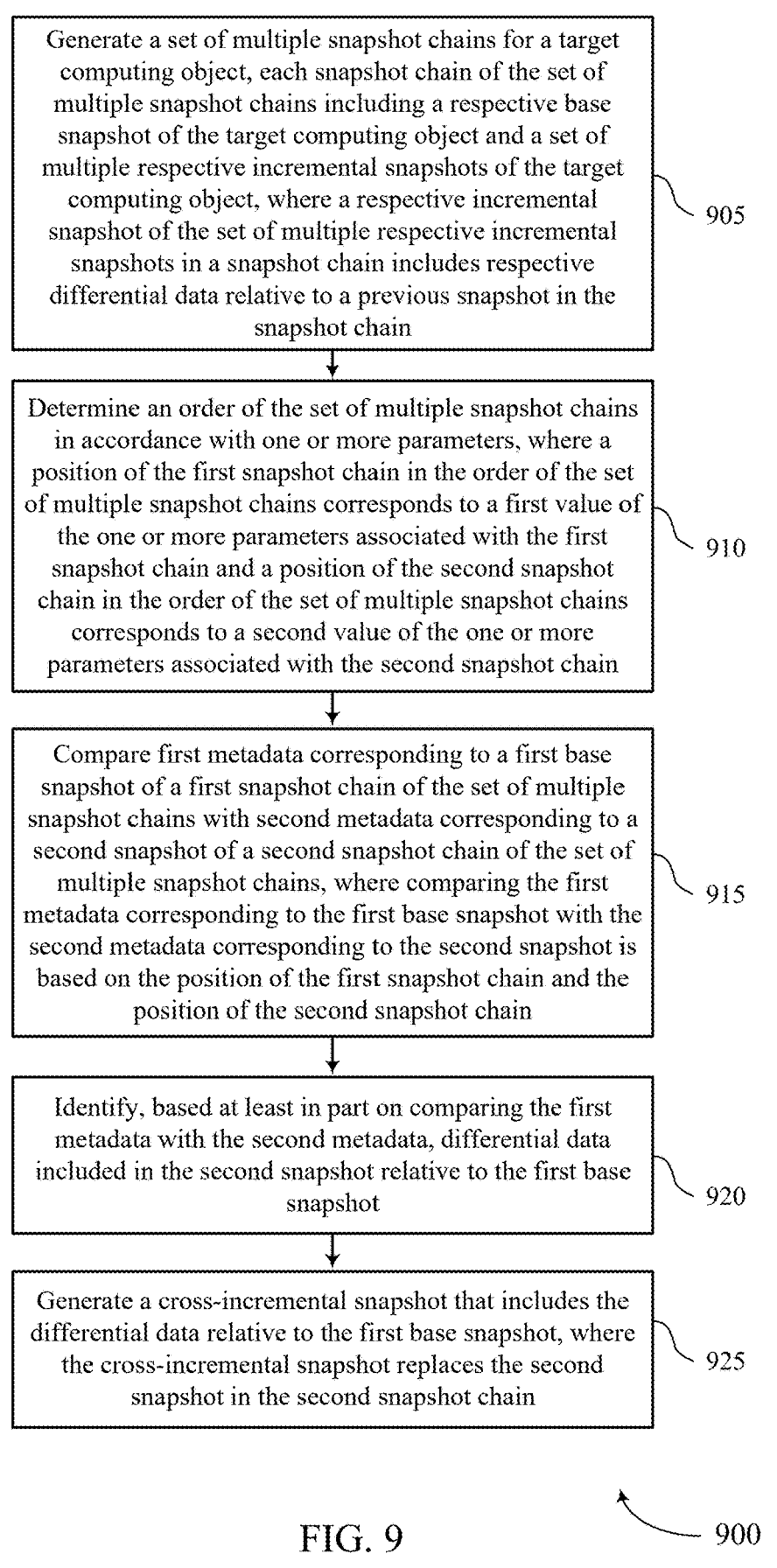

Generate a set of multiple snapshot chains for a target computing object, each snapshot chain of the set of multiple snapshot chains including a respective base snapshot of the target computing object and a set of multiple respective incremental snapshots of the target computing object, where a respective incremental snapshot of the set of multiple respective incremental snapshots in a snapshot chain includes respective differential data relative to a previous snapshot in the snapshot chain

905

Determine an order of the set of multiple snapshot chains in accordance with one or more parameters, where a position of the first snapshot chain in the order of the set of multiple snapshot chains corresponds to a first value of the one or more parameters associated with the first snapshot chain and a position of the second snapshot chain in the order of the set of multiple snapshot chains corresponds to a second value of the one or more parameters associated with the second snapshot chain

910

Compare first metadata corresponding to a first base snapshot of a first snapshot chain of the set of multiple snapshot chains with second metadata corresponding to a second snapshot of a second snapshot chain of the set of multiple snapshot chains, where comparing the first metadata corresponding to the first base snapshot with the second metadata corresponding to the second snapshot is based on the position of the first snapshot chain and the position of the second snapshot chain

915

Identify, based at least in part on comparing the first metadata with the second metadata, differential data included in the second snapshot relative to the first base snapshot

920

Generate a cross-incremental snapshot that includes the differential data relative to the first base snapshot, where the cross-incremental snapshot replaces the second snapshot in the second snapshot chain

CLOUD DATA REWRITES USING DEDUPLICATION

FIELD OF TECHNOLOGY

The present disclosure relates generally to data management, including techniques for cloud data rewrites using deduplication.

BACKGROUND

A data management system (DMS) may be employed to manage data associated with one or more computing systems. The data may be generated, stored, or otherwise used by the one or more computing systems, examples of which may include servers, databases, virtual machines, cloud computing systems, file systems (e.g., network-attached storage (NAS) systems), or other data storage or processing systems. The DMS may provide data backup, data recovery, data classification, or other types of data management services for data of the one or more computing systems. Improved data management may offer improved performance with respect to reliability, speed, efficiency, scalability, security, or ease-of-use, among other possible aspects of performance.

BRIEF DESCRIPTION OF THE DRAWINGS

FIGS. 8 and 9 show flowcharts illustrating methods that support cloud data rewrites using deduplication in accordance with aspects of the present disclosure.

DETAILED DESCRIPTION

Figure 1:
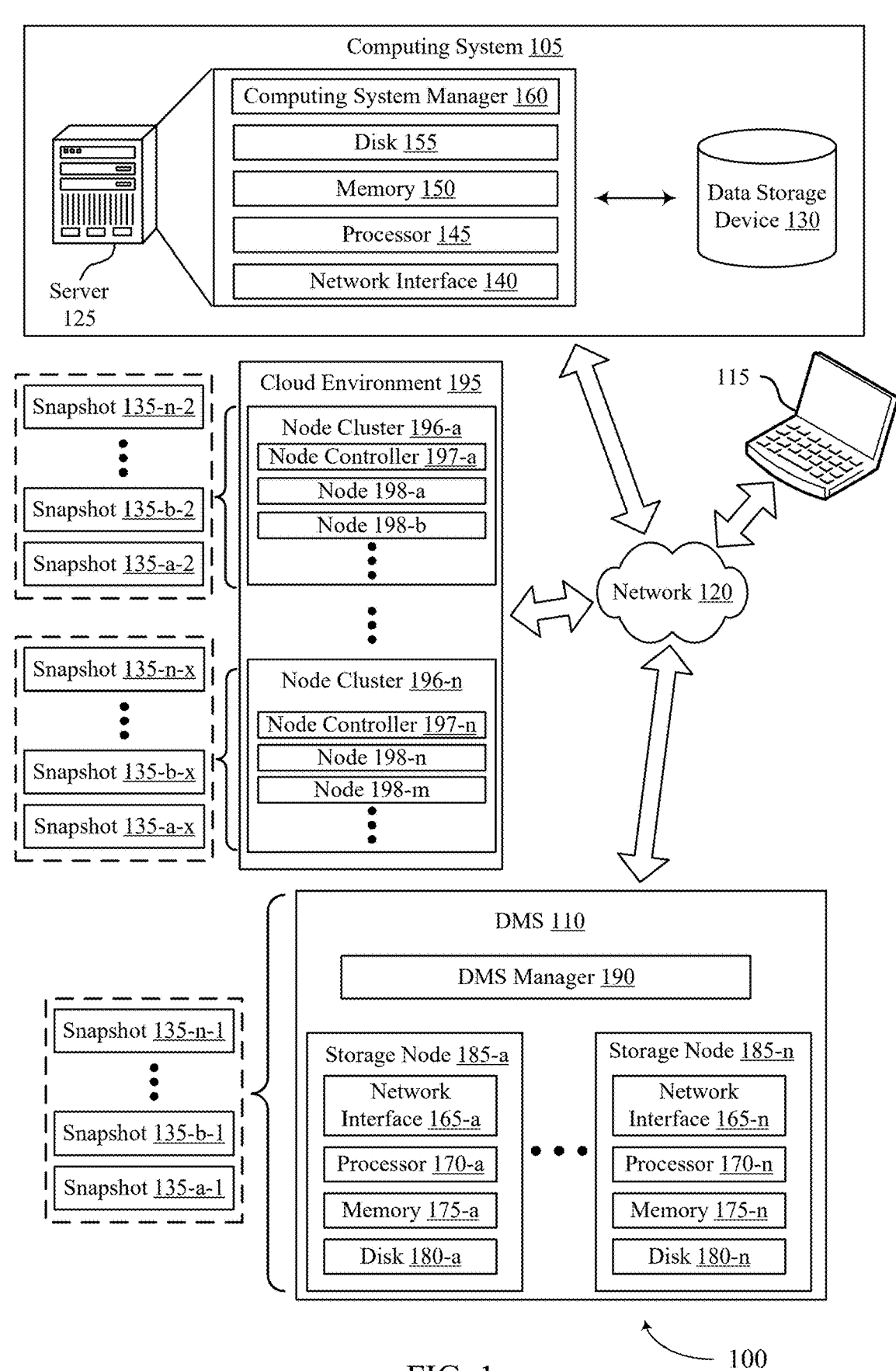
FIG. 1 illustrates an example of a computing environment that supports cloud data rewrites using deduplication in accordance with aspects of the present disclosure.

Some backup and recovery systems may use snapshot chains, where snapshots of a target computing object are stored as chains that include a full (or base) snapshot along with one or more incremental snapshots. Each incremental snapshot may reflect the changes to the target computing object since a time corresponding to a prior snapshot in the chain. Snapshots may expire (e.g., may no longer be retained) over time in accordance with a retention policy. As snapshots expire, a data management system (DMS) may not immediately garbage collect, or delete, the expired snapshots because other snapshots (e.g., one or more later incremental snapshots) in the snapshot chain may depend on them. Instead, the DMS may consolidate (e.g., merge) expired snapshots with the next unexpired snapshot in the chain to reclaim storage space.

In some archival storage systems (e.g., cloud environments), computational operations, such as consolidation operations, may be more expensive relative to storage space, such that frequent consolidation operations may be disfavored. However, the longer a snapshot chain becomes, the more latency may be associated with a recovery operation for the target computing object (e.g., due to the DMS traversing a longer chain of incremental snapshots to restore the target computing object). Accordingly, the DMS may limit snapshot chains to a threshold chain length (e.g., 60). After hitting the threshold, the DMS may generate a new chain with a new base snapshot and a quantity of incremental snapshots. This way, once every snapshot in a chain expires, the entire chain may be deleted and consolidation operations may be avoided. However, base snapshots may use a relatively large storage space compared to incremental snapshots, and further, the base snapshots in each chain may have a relatively long retention policy. For example, if a base snapshot is taken every two months (e.g., every 60 days), and if each base snapshot is retained for a year, the storage system may have six snapshot chains using a relatively large amount of storage space at any moment during the year. Accordingly, it may be beneficial to reduce the storage space used by retained snapshot chains without performing expensive computation operations.

Techniques described herein enable a DMS to identify similar snapshots and rewrite one as an incremental over the other. That is, a first base snapshot in a first snapshot chain (e.g., corresponding to earlier points in time) may be rewritten to become a "cross-incremental" snapshot of a second base snapshot in a second snapshot chain (e.g., corresponding to later points in time). Rewriting the first base snapshot as a cross-incremental snapshot may reduce the amount of storage used by the first snapshot chain (as incremental snapshots use significantly less space than full snapshots) while maintaining an ability to perform a recovery operation without traversing an unduly long linear chain of snapshots, among other potential benefits. For example, the six snapshot chains may be ordered based on their expected expired times in descending order, with the chain that expires the latest as the "base chain." The base snapshot of the chain with the second latest expiration may be rewritten to be the immediate cross-incremental snapshot to the first chain. The DMS may follow this process for the remaining chains in cascading order (the third chain base snapshot may be rewritten to be the cross-incremental to the second chain cross-incremental and so on).

Base snapshots may be rewritten as cross-incremental snapshots based on comparing the metadata (e.g., fingerprint files) of the first base snapshot with the metadata of the second snapshot to determine which data blocks have changed in the first base snapshot relative to the second base snapshot. Based on the comparison, the changed data blocks may be read from a patch file of the first base snapshot, and the changed data blocks may be written to a new patch file for the cross-incremental snapshot. A cross-rebase operation may rewrite the metadata of the incremental snapshots that previously depended on the first base snapshot to reference the new cross-incremental snapshot without moving any data in the incremental snapshots of the first snapshot chain.

FIG. 1 illustrates an example of a computing environment 100 that supports cloud data rewrites using deduplication in accordance with aspects of the present disclosure. The computing environment 100 may include a computing system 105, a DMS 110, and one or more computing devices 115, which may be in communication with one another via a network 120. The computing system 105 may generate, store, process, modify, or otherwise use associated data, and the DMS 110 may provide one or more data management services for the computing system 105. For example, the DMS 110 may provide a data backup service, a data recovery service, a data classification service, a data transfer or replication service, one or more other data management services, or any combination thereof for data associated with the computing system 105.

The network 120 may allow the one or more computing devices 115, the computing system 105, and the DMS 110 to communicate (e.g., exchange information) with one another. The network 120 may include aspects of one or more wired networks (e.g., the Internet), one or more wireless networks (e.g., cellular networks), or any combination thereof. The network 120 may include aspects of one or more public networks or private networks, as well as secured or unsecured networks, or any combination thereof. The network 120 also may include any quantity of communications links and any quantity of hubs, bridges, routers, switches, ports or other physical or logical network components.

A computing device 115 may be used to input information to or receive information from the computing system 105, the DMS 110, or both. For example, a user of the computing device 115 may provide user inputs via the computing device 115, which may result in commands, data, or any combination thereof being communicated via the network 120 to the computing system 105, the DMS 110, or both. Additionally, or alternatively, a computing device 115 may output (e.g., display) data or other information received from the computing system 105, the DMS 110, or both. A user of a computing device 115 may, for example, use the computing device 115 to interact with one or more user interfaces (e.g., graphical user interfaces (GUIs)) to operate or otherwise interact with the computing system 105, the DMS 110, or both. Though one computing device 115 is shown in FIG. 1, it is to be understood that the computing environment 100 may include any quantity of computing devices 115.

A computing device 115 may be a stationary device (e.g., a desktop computer or access point) or a mobile device (e.g., a laptop computer, tablet computer, or cellular phone). In some examples, a computing device 115 may be a commercial computing device, such as a server or collection of servers. And in some examples, a computing device 115 may be a virtual device (e.g., a virtual machine). Though shown as a separate device in the example computing environment of FIG. 1, it is to be understood that in some cases a computing device 115 may be included in (e.g., may be a component of) the computing system 105 or the DMS 110.

The computing system 105 may include one or more servers 125 and may provide (e.g., to the one or more computing devices 115) local or remote access to applications, databases, or files stored within the computing system 105. The computing system 105 may further include one or more data storage devices 130. Though one server 125 and one data storage device 130 are shown in FIG. 1, it is to be understood that the computing system 105 may include any quantity of servers 125 and any quantity of data storage devices 130, which may be in communication with one another and collectively perform one or more functions ascribed herein to the server 125 and data storage device 130.

A data storage device 130 may include one or more hardware storage devices operable to store data, such as one or more hard disk drives (HDDs), magnetic tape drives, solid-state drives (SSDs), storage area network (SAN) storage devices, or network-attached storage (NAS) devices. In some cases, a data storage device 130 may comprise a tiered data storage infrastructure (or a portion of a tiered data storage infrastructure). A tiered data storage infrastructure may allow for the movement of data across different tiers of the data storage infrastructure between higher-cost, higher-performance storage devices (e.g., SSDs and HDDs) and relatively lower-cost, lower-performance storage devices (e.g., magnetic tape drives). In some examples, a data storage device 130 may be a database (e.g., a relational database), and a server 125 may host (e.g., provide a database management system for) the database.

A server 125 may allow a client (e.g., a computing device 115) to download information or files (e.g., executable, text, application, audio, image, or video files) from the computing system 105, to upload such information or files to the computing system 105, or to perform a search query related to particular information stored by the computing system 105. In some examples, a server 125 may act as an application server or a file server. In general, a server 125 may refer to one or more hardware devices that act as the host in a client-server relationship or a software process that shares a resource with or performs work for one or more clients.

A server 125 may include a network interface 140, processor 145, memory 150, disk 155, and computing system manager 160. The network interface 140 may enable the server 125 to connect to and exchange information via the network 120 (e.g., using one or more network protocols). The network interface 140 may include one or more wireless network interfaces, one or more wired network interfaces, or any combination thereof. The processor 145 may execute computer-readable instructions stored in the memory 150 in order to cause the server 125 to perform functions ascribed herein to the server 125. The processor 145 may include one or more processing units, such as one or more central processing units (CPUs), one or more graphics processing units (GPUs), or any combination thereof. The memory 150 may comprise one or more types of memory (e.g., random access memory (RAM), static random access memory (SRAM), dynamic random access memory (DRAM), read-only memory (ROM), electrically erasable programmable read-only memory (EEPROM), Flash, etc.). Disk 155 may include one or more HDDs, one or more SSDs, or any combination thereof. Memory 150 and disk 155 may comprise hardware storage devices. The computing system manager 160 may manage the computing system 105 or aspects thereof (e.g., based on instructions stored in the memory 150 and executed by the processor 145) to perform functions ascribed herein to the computing system 105. In some examples, the network interface 140, processor 145, memory 150, and disk 155 may be included in a hardware layer of a server 125, and the computing system manager 160 may be included in a software layer of the server 125. In some cases, the computing system manager 160 may be distributed across (e.g., implemented by) multiple servers 125 within the computing system 105.

In some examples, the computing system 105 or aspects thereof may be implemented within one or more cloud computing environments, which may alternatively be referred to as cloud environments. Cloud computing may refer to Internet-based computing, wherein shared resources, software, and/or information may be provided to one or more computing devices on-demand via the Internet. A cloud environment may be provided by a cloud platform, where the cloud platform may include physical hardware components (e.g., servers) and software components (e.g., operating system) that implement the cloud environment. A cloud environment may implement the computing system 105 or aspects thereof through Software-as-a-Service (SaaS) or Infrastructure-as-a-Service (IaaS) services provided by the cloud environment. SaaS may refer to a software distribution model in which applications are hosted by a service provider and made available to one or more client devices over a network (e.g., to one or more computing devices 115 over the network 120). IaaS may refer to a service in which physical computing resources are used to instantiate one or more virtual machines, the resources of which are made available to one or more client devices over a network (e.g., to one or more computing devices 115 over the network 120).

In some examples, the computing system 105 or aspects thereof may implement or be implemented by one or more virtual machines. The one or more virtual machines may run various applications, such as a database server, an application server, or a web server. For example, a server 125 may be used to host (e.g., create, manage) one or more virtual machines, and the computing system manager 160 may manage a virtualized infrastructure within the computing system 105 and perform management operations associated with the virtualized infrastructure. The computing system manager 160 may manage the provisioning of virtual machines running within the virtualized infrastructure and provide an interface to a computing device 115 interacting with the virtualized infrastructure. For example, the computing system manager 160 may be or include a hypervisor and may perform various virtual machine-related tasks, such as cloning virtual machines, creating new virtual machines, monitoring the state of virtual machines, moving virtual machines between physical hosts for load balancing purposes, and facilitating backups of virtual machines. In some examples, the virtual machines, the hypervisor, or both, may virtualize and make available resources of the disk 155, the memory, the processor 145, the network interface 140, the data storage device 130, or any combination thereof in support of running the various applications. Storage resources (e.g., the disk 155, the memory 150, or the data storage device 130) that are virtualized may be accessed by applications as a virtual disk.

The DMS 110 may provide one or more data management services for data associated with the computing system 105 and may include DMS manager 190 and any quantity of storage nodes 185. The DMS manager 190 may manage operation of the DMS 110, including the storage nodes 185. Though illustrated as a separate entity within the DMS 110, the DMS manager 190 may in some cases be implemented (e.g., as a software application) by one or more of the storage nodes 185. In some examples, the storage nodes 185 may be included in a hardware layer of the DMS 110, and the DMS manager 190 may be included in a software layer of the DMS 110. In the example illustrated in FIG. 1, the DMS 110 is separate from the computing system 105 but in communication with the computing system 105 via the network 120. It is to be understood, however, that in some examples at least some aspects of the DMS 110 may be located within computing system 105. For example, one or more servers 125, one or more data storage devices 130, and at least some aspects of the DMS 110 may be implemented within the same cloud environment or within the same data center.

Storage nodes 185 of the DMS 110 may include respective network interfaces 165, processors 170, memories 175, and disks 180. The network interfaces 165 may enable the storage nodes 185 to connect to one another, to the network 120, or both. A network interface 165 may include one or more wireless network interfaces, one or more wired network interfaces, or any combination thereof. The processor 170 of a storage node 185 may execute computer-readable instructions stored in the memory 175 of the storage node 185 in order to cause the storage node 185 to perform processes described herein as performed by the storage node 185. A processor 170 may include one or more processing units, such as one or more CPUs, one or more GPUs, or any combination thereof. The memory 150 may comprise one or more types of memory (e.g., RAM, SRAM, DRAM, ROM, EEPROM, Flash, etc.). A disk 180 may include one or more HDDs, one or more SDDs, or any combination thereof. Memories 175 and disks 180 may comprise hardware storage devices. Collectively, the storage nodes 185 may in some cases be referred to as a storage cluster or as a cluster of storage nodes 185.

The DMS 110 may provide a backup and recovery service for the computing system 105. For example, the DMS 110 may manage the extraction and storage of snapshots 135 associated with different point-in-time versions of one or more target computing objects within the computing system 105. A snapshot 135 of a computing object (e.g., a virtual machine, a database, a filesystem, a virtual disk, a virtual desktop, or other type of computing system or storage system) may be a file (or set of files) that represents a state of the computing object (e.g., the data thereof) as of a particular point in time. A snapshot 135 may also be used to restore (e.g., recover) the corresponding computing object as of the particular point in time corresponding to the snapshot 135. In some cases, a computing object that is the subject of a snapshot 135 may be or include a collection of multiple objects (e.g., computing objects may have hierarchical relationships, with lower-level computing objects included within one or more higher-level computing objects). For example, a filesystem may include multiple files, and along with the filesystem being a computing object, the files therein may also be computing objects. Or, as another example, a database may include multiple tables, and along with the database being a computing object, the tables therein may also be computing objects. Thus, a snapshot may be of one or more computing objects, and a snapshot of a first computing object (e.g., a higher-level computing object) may also be a snapshot of each computing object (e.g., each lower-level computing object) that is included in (e.g., is a member or component of) the first computing object. Additionally, a snapshot may be of one or more lower-level computing objects individually (e.g., a snapshot of a lower-level computing object may be separate from another snapshot of another lower-level computing object, separate from another snapshot of a higher-level computing object that contains the lower-level computing object, or both).

A computing object of which a snapshot 135 may be generated may be referred to as snappable. Snapshots 135 may be generated at different times (e.g., periodically or on some other scheduled or configured basis) in order to represent the state of the computing system 105 or aspects thereof as of those different times. In some examples, a snapshot 135 may include metadata that defines a state of the computing object as of a particular point in time. For example, a snapshot 135 may include metadata associated with (e.g., that defines a state of) some or all data blocks included in (e.g., stored by or otherwise included in) the computing object. Snapshots 135 (e.g., collectively) may capture changes in the data blocks over time. Snapshots 135 generated for the target computing objects within the computing system 105 may be stored in one or more storage locations (e.g., the disk 155, memory 150, the data storage device 130) of the computing system 105, in the alternative or in addition to being stored within the DMS 110, as described below.

To obtain a snapshot 135 of a target computing object associated with the computing system 105 (e.g., of the entirety of the computing system 105 or some portion thereof, such as one or more databases, virtual machines, or filesystems within the computing system 105), the DMS manager 190 may transmit a snapshot request to the computing system manager 160. In response to the snapshot request, the computing system manager 160 may set the target computing object into a frozen state (e.g., a read-only state). Setting the target computing object into a frozen state may allow a point-in-time snapshot 135 of the target computing object to be stored or transferred.

In some examples, the computing system 105 may generate the snapshot 135 based on the frozen state of the computing object. For example, the computing system 105 may execute an agent of the DMS 110 (e.g., the agent may be software installed at and executed by one or more servers 125), and the agent may cause the computing system 105 to generate the snapshot 135 and transfer the snapshot 135 to the DMS 110 in response to the request from the DMS 110. In some examples, the computing system manager 160 may cause the computing system 105 to transfer, to the DMS 110, data that represents the frozen state of the target computing object, and the DMS 110 may generate a snapshot 135 of the target computing object based on the corresponding data received from the computing system 105.

Once the DMS 110 receives, generates, or otherwise obtains a snapshot 135, the DMS 110 may store the snapshot 135 at one or more of the storage nodes 185. The DMS 110 may store a snapshot 135 at multiple storage nodes 185, for example, for improved reliability. Additionally, or alternatively, snapshots 135 may be stored in some other location connected with the network 120. For example, the DMS 110 may store more recent snapshots 135 at the storage nodes 185, and the DMS 110 may transfer less recent snapshots 135 via the network 120 to a cloud environment (which may include or be separate from the computing system 105) for storage at the cloud environment, a magnetic tape storage device, or another storage system separate from the DMS 110.

Updates made to a target computing object that has been set into a frozen state may be written by the computing system 105 to a separate file (e.g., an update file) or other entity within the computing system 105 while the target computing object is in the frozen state. After the snapshot 135 (or associated data) of the target computing object has been transferred to the DMS 110, the computing system manager 160 may release the target computing object from the frozen state, and any corresponding updates written to the separate file or other entity may be merged into the target computing object.

In response to a restore command (e.g., from a computing device 115 or the computing system 105), the DMS 110 may restore a target version (e.g., corresponding to a particular point in time) of a computing object based on a corresponding snapshot 135 of the computing object. In some examples, the corresponding snapshot 135 may be used to restore the target version based on data of the computing object as stored at the computing system 105 (e.g., based on information included in the corresponding snapshot 135 and other information stored at the computing system 105, the computing object may be restored to its state as of the particular point in time). Additionally, or alternatively, the corresponding snapshot 135 may be used to restore the data of the target version based on data of the computing object as included in one or more backup copies of the computing object (e.g., file-level backup copies or image-level backup copies). Such backup copies of the computing object may be generated in conjunction with or according to a separate schedule than the snapshots 135. For example, the target version of the computing object may be restored based on the information in a snapshot 135 and based on information included in a backup copy of the target object generated prior to the time corresponding to the target version. Backup copies of the computing object may be stored at the DMS 110 (e.g., in the storage nodes 185) or in some other location connected with the network 120 (e.g., in a cloud environment, which in some cases may be separate from the computing system 105).

In some examples, the DMS 110 may restore the target version of the computing object and transfer the data of the restored computing object to the computing system 105. And in some examples, the DMS 110 may transfer one or more snapshots 135 to the computing system 105, and restoration of the target version of the computing object may occur at the computing system 105 (e.g., as managed by an agent of the DMS 110, where the agent may be installed and operate at the computing system 105).

In response to a mount command (e.g., from a computing device 115 or the computing system 105), the DMS 110 may instantiate data associated with a point-in-time version of a computing object based on a snapshot 135 corresponding to the computing object (e.g., along with data included in a backup copy of the computing object) and the point-in-time. The DMS 110 may then allow the computing system 105 to read or modify the instantiated data (e.g., without transferring the instantiated data to the computing system). In some examples, the DMS 110 may instantiate (e.g., virtually mount) some or all of the data associated with the point-in-time version of the computing object for access by the computing system 105, the DMS 110, or the computing device 115.

In some examples, the DMS 110 may store different types of snapshots 135, including for the same computing object. For example, the DMS 110 may store both base snapshots 135 and incremental snapshots 135. A base snapshot 135 may represent the entirety of the state of the corresponding computing object as of a point in time corresponding to the base snapshot 135. A base snapshot 135 may alternatively be referred to as a full snapshot 135. An incremental snapshot 135 may represent the changes to the state—which may be referred to as the delta—of the corresponding computing object that have occurred between an earlier or later point in time corresponding to another snapshot 135 (e.g., another base snapshot 135 or incremental snapshot 135) of the computing object and the incremental snapshot 135. In some cases, some incremental snapshots 135 may be forward-incremental snapshots 135 and other incremental snapshots 135 may be reverse-incremental snapshots 135. To generate a base snapshot 135 of a computing object using a forward-incremental snapshot 135, the information of the forward-incremental snapshot 135 may be combined with (e.g., applied to) the information of an earlier base snapshot 135 of the computing object along with the information of any intervening forward-incremental snapshots 135, where the earlier base snapshot 135 may include a base snapshot 135 and one or more reverse-incremental or forward-incremental snapshots 135. To generate a base snapshot 135 of a computing object using a reverse-incremental snapshot 135, the information of the reverse-incremental snapshot 135 may be combined with (e.g., applied to) the information of a later base snapshot 135 of the computing object along with the information of any intervening reverse-incremental snapshots 135.

In some examples, the DMS 110 may provide a data classification service, a malware detection service, a data transfer or replication service, backup verification service, or any combination thereof, among other possible data management services for data associated with the computing system 105. For example, the DMS 110 may analyze data included in one or more computing objects of the computing system 105, metadata for one or more computing objects of the computing system 105, or any combination thereof, and based on such analysis, the DMS 110 may identify locations within the computing system 105 that include data of one or more target data types (e.g., sensitive data, such as data subject to privacy regulations or otherwise of particular interest) and output related information (e.g., for display to a user via a computing device 115). Additionally, or alternatively, the DMS 110 may detect whether aspects of the computing system 105 have been impacted by malware (e.g., ransomware). Additionally, or alternatively, the DMS 110 may relocate data or create copies of data based on using one or more snapshots 135 to restore the associated computing object within its original location or at a new location (e.g., a new location within a different computing system 105). Additionally, or alternatively, the DMS 110 may analyze backup data to ensure that the underlying data (e.g., user data or metadata) has not been corrupted. The DMS 110 may perform such data classification, malware detection, data transfer or replication, or backup verification, for example, based on data included in snapshots 135 or backup copies of the computing system 105, rather than live contents of the computing system 105, which may beneficially avoid adversely affecting (e.g., infecting, loading, etc.) the computing system 105.

In some examples, the DMS 110, and in particular the DMS manager 190, may be referred to as a control plane. The control plane may manage tasks, such as storing data management data or performing restorations, among other possible examples. The control plane may be common to multiple customers or tenants of the DMS 110. For example, the computing system 105 may be associated with a first customer or tenant of the DMS 110, and the DMS 110 may similarly provide data management services for one or more other computing systems associated with one or more additional customers or tenants. In some examples, the control plane may be configured to manage the transfer of data management data (e.g., snapshots 135 associated with the computing system 105) to a cloud environment 195 (e.g., Microsoft Azure or Amazon Web Services). In addition, or as an alternative, to being configured to manage the transfer of data management data to the cloud environment 195, the control plane may be configured to transfer metadata for the data management data to the cloud environment 195. The metadata may be configured to facilitate storage of the stored data management data, the management of the stored management data, the processing of the stored management data, the restoration of the stored data management data, and the like.

Each customer or tenant of the DMS 110 may have a private data plane, where a data plane may include a location at which customer or tenant data is stored. For example, each private data plane for each customer or tenant may include a node cluster 196 across which data (e.g., data management data, metadata for data management data, etc.) for a customer or tenant is stored. Each node cluster 196 may include a node controller 197 which manages the nodes 198 of the node cluster 196. As an example, a node cluster 196 for one tenant or customer may be hosted on Microsoft Azure, and another node cluster 196 may be hosted on Amazon Web Services. In another example, multiple separate node clusters 196 for multiple different customers or tenants may be hosted on Microsoft Azure. Separating each customer or tenant's data into separate node clusters 196 provides fault isolation for the different customers or tenants and provides security by limiting access to data for each customer or tenant.

The control plane (e.g., the DMS 110, and specifically the DMS manager 190) manages tasks, such as storing backups or snapshots 135 or performing restorations, across the multiple node clusters 196. For example, as described herein, a node cluster 196-*a* may be associated with the first customer or tenant associated with the computing system 105. The DMS 110 may obtain (e.g., generate or receive) and transfer the snapshots 135 associated with the computing system 105 to the node cluster 196-*a* in accordance with a service level agreement for the first customer or tenant associated with the computing system 105. For example, a service level agreement may define backup and recovery parameters for a customer or tenant such as snapshot generation frequency, which computing objects to backup, where to store the snapshots 135 (e.g., which private data plane), and how long to retain snapshots 135. As described herein, the control plane may provide data management services for another computing system associated with another customer or tenant. For example, the control plane may generate and transfer snapshots 135 for another computing system associated with another customer or tenant to the node cluster 196-*n* in accordance with the service level agreement for the other customer or tenant.

To manage tasks, such as storing backups or snapshots 135 or performing restorations, across the multiple node clusters 196, the control plane (e.g., the DMS manager 190) may communicate with the node controllers 197 for the various node clusters via the network 120. For example, the control plane may exchange communications for backup and recovery tasks with the node controllers 197 in the form of transmission control protocol (TCP) packets via the network 120.

Some backup and recovery systems may use snapshot chains, where snapshots 135 of a target computing object are stored as chains that include a base snapshot 135 along with one or more incremental snapshots 135. Each incremental snapshot 135 may reflect the changes to the target computing object since a time corresponding to a prior snapshot 135 in the chain. Snapshots 135 may expire (e.g., may no longer be retained) over time in accordance with a retention policy. As snapshots 135 expire, the DMS 110 may not immediately garbage collect, or delete, the expired snapshots 135 because other snapshots 135 (e.g., one or more later incremental snapshots) in the snapshot chain may depend on them. Instead, the DMS 110 may consolidate (e.g., merge) expired snapshots 135 with the next unexpired snapshot 135 in the chain to reclaim storage space.

In some archival storage systems (e.g., cloud environments), computational operations, such as consolidation operations, may be more expensive relative to storage space, such that frequent consolidation operations may be disfavored. However, the longer a snapshot chain becomes, the more latency may be associated with a recovery operation for the target computing object (e.g., due to the DMS 110 traversing a longer chain of incremental snapshots 135 to restore the target computing object). Accordingly, the DMS 110 may limit snapshot chains to a threshold chain length (e.g., 60). After hitting the threshold, the DMS 110 may generate a new chain with a new base snapshot 135 and a quantity of incremental snapshots 135. This way, once every snapshot 135 in a chain expires, the entire chain may be deleted and consolidation operations may be avoided. However, base snapshots 135 may use a relatively large storage space compared to incremental snapshots 135, and further, the base snapshots 135 in each chain may have a relatively long retention policy. For example, if a base snapshot 135 is taken every two months (e.g., every 60 days), and if each base snapshot 135 is retained for a year, the storage system may have six snapshot chains using a relatively large amount of storage space at any moment during the year. Accordingly, it may be beneficial to reduce the storage space used by retained snapshot chains without performing expensive computation operations.

The techniques described herein enable the DMS 110 to identify similar snapshots 135 and rewrite one as an incremental over the other. That is, a first base snapshot 135 in a first snapshot chain (e.g., corresponding to earlier points in time) may be rewritten to become a "cross-incremental" snapshot 135 of a second base snapshot 135 in a second snapshot chain (e.g., corresponding to later points in time). Rewriting the first base snapshot 135 as a cross-incremental snapshot 135 may reduce the amount of storage used by the first snapshot chain (as incremental snapshots use significantly less space than full snapshots) while maintaining an ability to perform a recovery operation without traversing an unduly long linear chain of snapshots 135, among other potential benefits. For example, the six snapshot chains may be ordered based on their expected expired times in descending order, with the chain that expires the latest as the "base chain." The base snapshot 135 of the chain with the second latest expiration may be rewritten to be the immediate cross-incremental snapshot 135 to the first chain. The DMS 110 may follow this process for the remaining chains in cascading order (the third chain base snapshot 135 may be rewritten to be the cross-incremental to the second chain cross-incremental and so on).

Base snapshots 135 may be rewritten as cross-incremental snapshots 135 based on comparing the metadata (e.g., fingerprint files) of the first base snapshot 135 with the metadata of the second snapshot 135 to determine which data blocks have changed in the first base snapshot 135 relative to the second base snapshot 135. Based on the comparison, the changed data blocks may be read from a patch file of the first base snapshot 135, and the changed data blocks may be written to a new patch file for the cross-incremental snapshot 135. A cross-rebase operation may rewrite the metadata of the incremental snapshots 135 that previously depended on the first base snapshot 135 to reference the new cross-incremental snapshot 135 without moving any data in the incremental snapshots 135 of the first snapshot chain.

Figure 2:
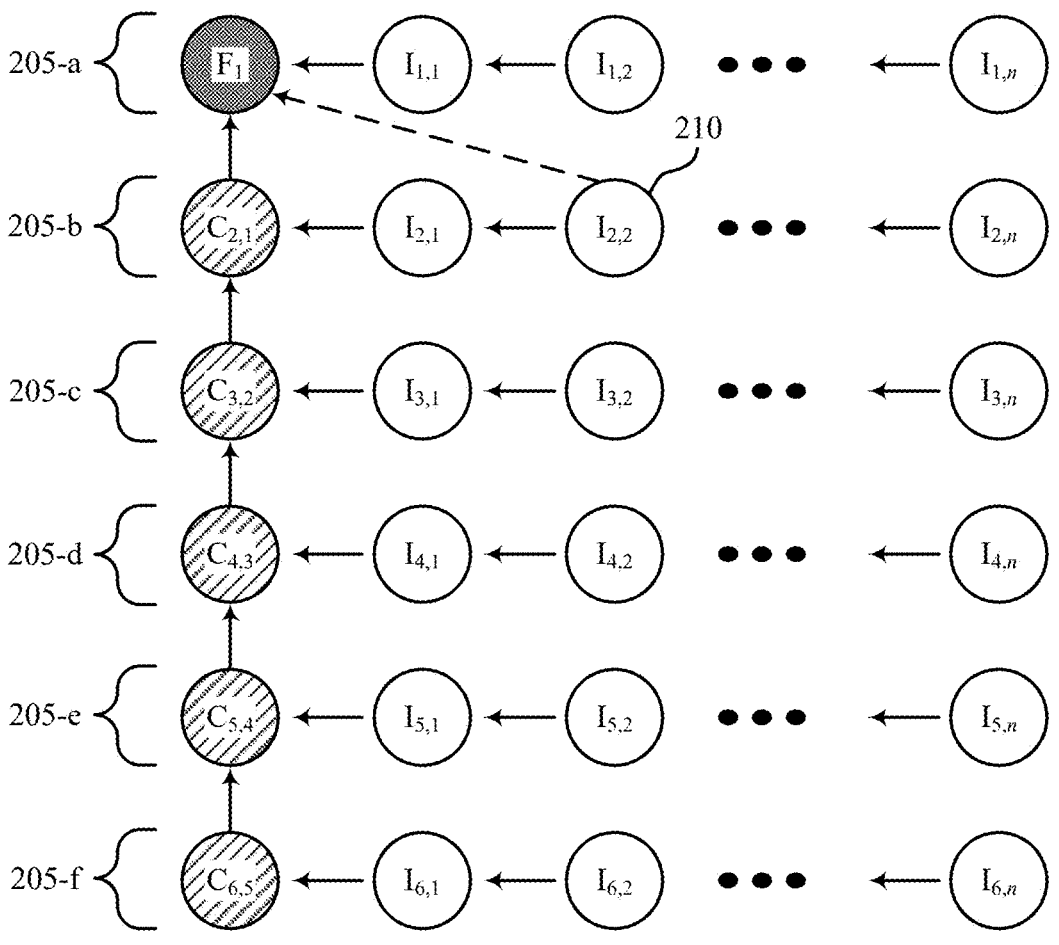
FIG. 2 shows an example of a snapshot chain diagram that supports cloud data rewrites using deduplication in accordance with aspects of the present disclosure.
Figure 2:
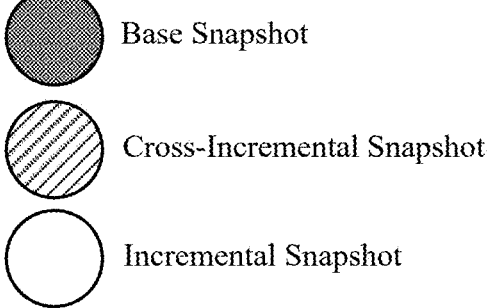

FIG. 2 shows an example of a snapshot chain diagram 200 that supports cloud data rewrites using deduplication in accordance with aspects of the present disclosure. The snapshot chain diagram 200 may implement or be implemented by aspects of the computing environment 100 described with reference to FIG. 1. For example, a DMS (e.g., a DMS 110 as described with reference to FIG. 1) may generate multiple snapshot chains 205. In some examples, each snapshot chain 205 may include a base snapshot (also referred to as a full snapshot) and one or more incremental snapshots ($I_{x,y}$) up to an nth incremental snapshot, where x is an index of a respective snapshot chain 205 and y is an index of a respective snapshot in the snapshot chain 205. For example, incremental snapshot $I_{4,2}$ may be the second incremental snapshot in a fourth snapshot chain 205-d. The base snapshot and incremental snapshots in a respective snapshot chain 205 may be examples of the snapshots 135 as described with reference to FIG. 1.

The snapshots in each of the snapshot chains 205 may be taken incrementally, where each incremental snapshot may depend on a previous snapshot. For example, incremental snapshot $I_{1,2}$ may depend on (e.g., include data that references) incremental snapshot $I_{1,1}$ (e.g., that in turn depends on base snapshot $F_1$) in snapshot chain 205-a. In some backup and recovery systems, the snapshots may expire (e.g., may no longer be retained by the DMS) over time in accordance with a retention policy. For example, each snapshot may be stored for a threshold duration (e.g., days, weeks, months) before expiring. In such systems, the DMS may perform a data consolidation operation on the expired snapshots and may reclaim storage space corresponding to the expired snapshots based on performing the data consolidation operation.

The data consolidation operation may consolidate (e.g., merge) data in expired snapshots with a next unexpired snapshot in a respective snapshot chain 205 to reclaim storage space in a storage environment for the snapshot chain 205. In some examples, expired snapshots may not be immediately deleted (e.g., garbage collected) because other incremental snapshots in the respective snapshot chain 205 may depend on the expired snapshots (e.g., incremental snapshot $I_{1,2}$ may depend on incremental snapshot $I_{1,1}$ after incremental snapshot $I_{1,1}$ expires). The consolidation operation may enable the DMS to delete the expired snapshots, such as incremental snapshot $I_{1,1}$, by merging relevant data (e.g., the data referenced by the next unexpired snapshot) in the expired snapshot with the next unexpired snapshot, such as incremental snapshot $I_{1,2}$.

However, in some other storage systems, consolidation operations may be associated with computational costs. That is, in archival storage systems or cloud environments, performing computational operations may be more expensive relative to storage space, and frequent consolidation operations may be disfavored. For example, in a cloud environment, the DMS may launch a computation node to perform the computational operations whereas in a non-cloud environment, computation nodes may be continuously (or substantially continuously) deployed. In such other storage systems, the DMS may implement a threshold snapshot chain length (e.g., 60 snapshots) for the snapshot chains 205. The longer a respective snapshot chain 205 becomes (e.g., as more incremental snapshots are added to the snapshot chain 205), the more latency may be associated with a recovery operation for the target computing object (e.g., due to the DMS traversing a longer chain of incremental snapshots to restore a target computing object).

After hitting the threshold chain length for a respective snapshot chain 205, the DMS may generate a new snapshot chain 205 with a new base snapshot and a quantity of incremental snapshots. The DMS may delete a snapshot chain 205 once all snapshots in the snapshot chain 205 expire. Deleting, or garbage collecting, the expired snapshot chains 205 may enable the DMS to reclaim space from the expired snapshots without performing a consolidation operation (e.g., garbage collection may have a reduced computational cost compared to the consolidation operation which reads and writes data included in the snapshots). However, base snapshots may use a relatively large storage space compared to incremental snapshots (e.g., an incremental snapshot may be 1% the size of a base snapshot), and further, the base snapshots in each snapshot chain 205 may have a relatively long retention policy. For example, if a base snapshot is taken every two months (e.g., every 60 days), and if the DMS retains each base snapshot for a year, the storage system may store up to six snapshot chains 205 using a relatively large amount of storage space at any moment during a year. Accordingly, it may be beneficial to reduce the storage space used by retained snapshot chains 205 without performing expensive computation operations.

The techniques described herein enable the DMS to identify two snapshots from two different snapshot chains 205 and rewrite one of the snapshots as an incremental snapshot over the other snapshot. That is, a first snapshot in a first snapshot chain 205 may be written to become a "cross-incremental" snapshot of a second snapshot in a second snapshot chain 205 that includes differential data relative to the first snapshot. For example, the DMS may rewrite a base snapshot of the snapshot chain 205-$b$ to be a cross-incremental snapshot $C_{2,1}$ over the base snapshot $F_1$ of the snapshot chain 205-$a$. In some examples, the base snapshot that remains intact (e.g., the base snapshot $F_1$) may be referred to as a cross base, and the snapshot chain that includes the cross base (e.g., snapshot chain 205-$a$) may be referred to as a base chain. Based on rewriting the base snapshot of the snapshot chain 205-$b$ as the cross-incremental snapshot $C_{2,1}$, the DMS may reduce the amount of storage space used by the snapshot chain 205-$b$ (as cross-incremental snapshots may use less space than base snapshots) while maintaining an ability for the DMS to perform a recovery operation without traversing an unduly long linear chain of snapshots, among other benefits.

Additionally, or alternatively, the DMS may rewrite an incremental snapshot in a snapshot chain 205 as a cross-incremental snapshot to a snapshot in another snapshot chain 205. For example, the DMS may identify and rewrite incremental snapshot $I_{2,2}$ as a cross-incremental snapshot 210. In such examples, to access data stored in subsequent snapshots (e.g., incremental snapshots that depend on the cross-incremental snapshot 210), the DMS may access data in the base snapshot of the snapshot chain 205-$b$ and the data in the incremental snapshot $I_{2,1}$ because the cross-incremental snapshot 210 may depend on those snapshots. That is, to access data from a cross-incremental snapshot, or from a snapshot that depends on a cross-incremental snapshot, the DMS may access data in any snapshots the cross-incremental snapshot depends on (e.g., up to a base snapshot of the cross-incremental snapshot).

In some examples, the DMS may identify which snapshots to rewrite as cross-incremental snapshots based on one or more parameters. The one or more parameters may include respective snapshot expiration times for each of the snapshot chains 205. For example, the DMS may determine, or identify, an expiration time for each of the snapshot chains 205. In some examples, a respective snapshot chain 205 may expire when all of the snapshots in the respective snapshot chain 205 are expired. The DMS may order the snapshot chains 205 in accordance with their expiration times in descending order. For example, the snapshot chain 205-$a$ may be the base chain because it may expire the earliest (e.g., snapshot chain 205-$b$ may expire after snapshot chain 205-$a$, snapshot chain 205-$c$ may expire after snapshot chain 205-$b$, and so on). Identifying the snapshots based on the one or more parameters may not affect the space reclamation for the snapshots. That is, any snapshot that was to be reclaimed for storage space at a time t (e.g., on an n-th day) may still be reclaimed at the time t.

Additionally, or alternatively, the one or more parameters may include a quantity of differential data between two snapshots. The quantity of differential data between two snapshots may reflect a periodic change (e.g., daily, weekly, monthly, among other examples, based on how often the DMS generates snapshots) or churn in the data. The DMS may order the snapshot chains 205 such that a threshold quantity of differential data between two snapshots is satisfied (e.g., the quantity of differential data is less than or equal to the threshold quantity). For example, the DMS may identify (determine or detect) that writing cross-incremental snapshot $C_{3,2}$ to depend on base snapshot $F_1$ may result in a 25% difference in data (e.g., the data in $C_{3,2}$ differs from the data in $F_1$ by 25%) whereas writing cross-incremental snapshot $C_{2,1}$ to depend on base snapshot $F_1$ results in a 10% difference in data. The DMS may write cross-incremental snapshot $C_{2,1}$ to depend on cross base $F_1$ to reduce a quantity of storage space relative to writing cross-incremental snapshot $C_{3,1}$ to depend on cross base $F_1$ (e.g., 25% differential data uses more storage space than 10% differential data). In some examples, the DMS may identify the differential data based on comparing the fingerprint files between two snapshots (e.g., based on performing a block-by-block comparison).

In some examples, the DMS may rewrite snapshots in each of the snapshot chains 205 to depend on a previous cross-incremental snapshot. For example, the DMS may rewrite the base snapshot in snapshot chain 205-$c$ as cross-incremental snapshot $C_{3,2}$ that depends on cross-incremental snapshot $C_{2,1}$, the base snapshot in snapshot chain 205-$d$ as cross-incremental snapshot $C_{4,3}$ that depends on cross-incremental snapshot $C_{3,2}$, and so on up to cross-incremental snapshot $C_{6,5}$ in snapshot chain 205-$f$ that depends on cross-incremental snapshot $C_{5,4}$ in snapshot chain 205-$e$. The process of rewriting snapshots in each of the snapshot chains 205 to be cross-incremental snapshots may be referred to as cascading crosses. Cascading crosses for the snapshot chains 205 may reduce the storage space used to store the snapshot chains 205 based on storing one base snapshot $F_1$ and rewriting the other snapshots as incremental snapshots that use less storage space than a base snapshot.

In some examples, the DMS may store metadata for each snapshot of a snapshot chain 205. For example, the DMS may store a patch file and a fingerprint file for each snapshot. The patch file may store the data included in a respective snapshot in blocks (e.g., at a granularity of 64 KB per block). The fingerprint file may store a hash code of the data (e.g., for each data block of 64 KB, the DMS may store a 20 byte hash code). In some examples, the DMS may store the hash code using a zero-optimized secure hash algorithm (e.g., SHA1). The DMS may rewrite a respective snapshot as a cross-incremental snapshot based on the fingerprint files of the cross base snapshot and the respective snapshot.

For example, the DMS may rewrite a snapshot as a cross-incremental snapshot based on comparing the fingerprint file of the snapshot with the fingerprint file of the cross base snapshot. The DMS may identify which blocks in the snapshot have changed relative to the cross base snapshot based on the fingerprint file comparison (e.g., there may be one hash for each block). In some examples, the DMS may estimate a quantity of data to be read and written for a rewrite of a base snapshot as a cross-incremental snapshot based on the fingerprint file comparison. In such examples, a compute time (e.g., runtime for running the compute machine) may be proportional to the estimated quantity of read and write data. In some cases, the DMS may order the one or more snapshot chains 205, determine a quantity of snapshots to rewrite, or both, in accordance with the compute time (e.g., the one or more parameters may include the compute time).

The DMS may read the changed blocks from the patch file for the snapshot and write them to a new patch file for the cross-incremental snapshot. As described further with reference to FIGS. 3A through 3C, the DMS may perform a cross-rebase operation to change, in the metadata of an incremental snapshot, a base reference of the incremental snapshot to reference the cross-incremental snapshot.

The DMS may delete the incremental snapshots in a respective snapshot chain 205 based on an expiration of the incremental snapshots (e.g., an expiration of all of the incremental snapshots in a respective snapshot chain 205). In some examples, the DMS may retain a cross base or cross-incremental snapshot after deleting the incremental snapshots in a respective snapshot chain 205. For example, the DMS may delete the incremental snapshots $I_{1,1}$ to $I_{1,n}$ and retain cross base snapshot $F_1$ in snapshot chain 205-$a$ because the cross-incremental snapshots (e.g., that are not expired) may depend on cross base snapshot $F_1$. In another example, the DMS may delete incremental snapshots $I_{2,1}$ to $I_{2,n}$ and retain cross-incremental snapshot $C_{2,1}$ in snapshot chain 205-$b$ (e.g., because cross-incremental snapshots $C_{3,2}$, $C_{4,3}$, and the like, may depend on cross-incremental snapshot $C_{2,1}$). In some cases, if an incremental snapshot in a snapshot chain 205 is rewritten as a cross-incremental snapshot, the DMS may retain any snapshots the cross-incremental snapshot depends on. For example, the DMS may retain incremental snapshot $I_{2,1}$ and the base snapshot for snapshot chain 205-$b$ for the cross-incremental snapshot 210. The DMS may delete the cross base $F_1$ and the cross-incremental snapshots when all of the cross base and cross-incremental snapshots expire.

In some examples, rewriting snapshots (e.g., base snapshots) as cross-incremental snapshots based on the one or more parameters may reduce redundant copies of similar data (e.g., substantially similar, storing more than 50% of the same data) in blocks (which may be referred to as data deduplication). In such examples, because the DMS may store one base snapshot (e.g., the cross base) and the differences (e.g., the cross-incremental snapshots) between subsequent snapshots, a storage space for storing the snapshot chains may be reduced. Although discussed with reference to snapshot chains, it is to be understood that the techniques described herein may apply to any snapshot system. For example, the DMS may correct tree-based snapshot topologies based on rewriting a snapshot as a cross-incremental snapshot (e.g., to rebalance the tree due to extended chain lengths or to facilitate more efficient garbage collection).

Figures 3A, 3B, 3C:
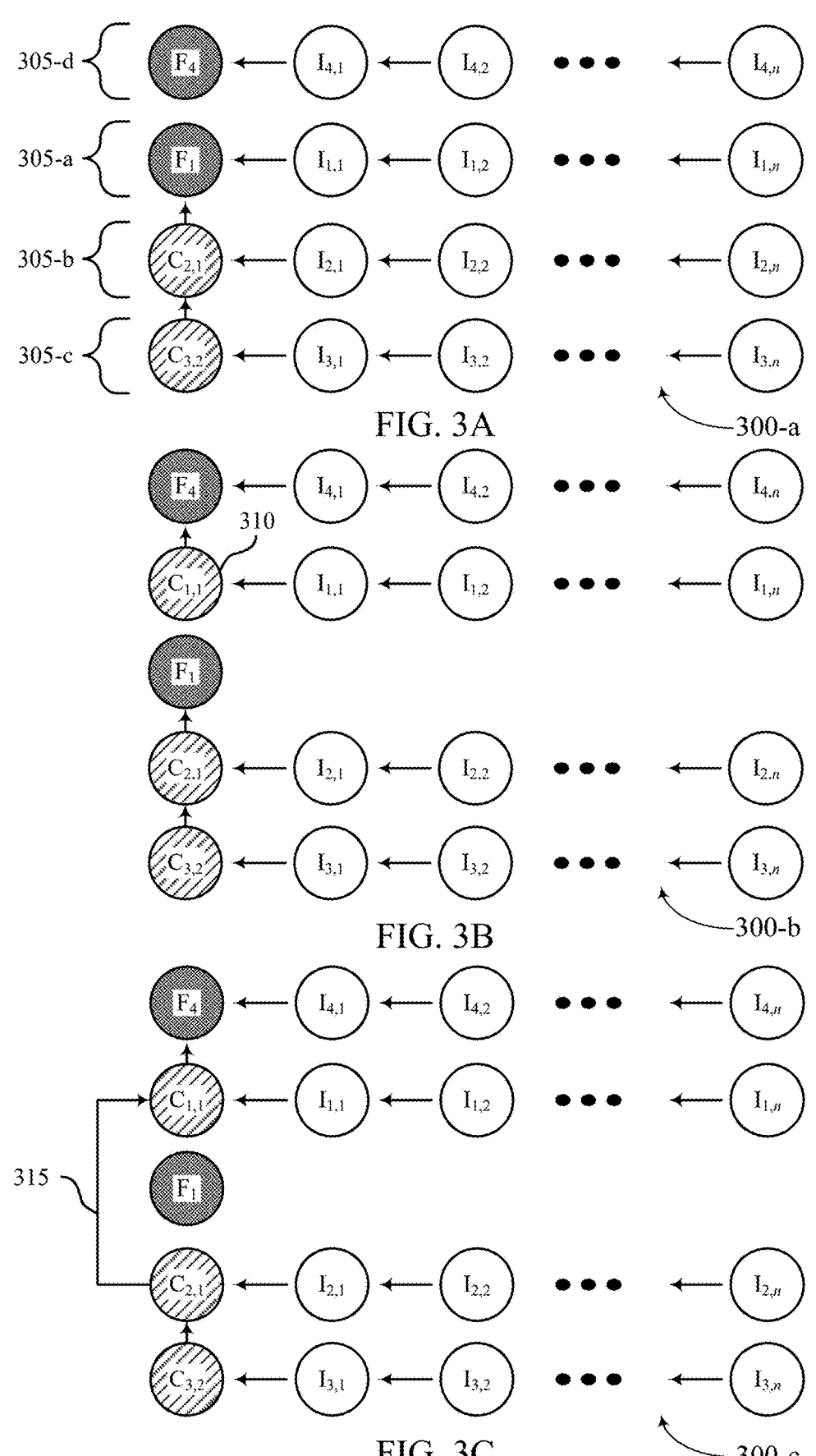
FIGS. 3A-3C show examples of cross-base operations that support cloud data rewrites using deduplication in accordance with aspects of the present disclosure.

FIGS. 3A through 3C show examples of cross-base operations 300 that support cloud data rewrites using deduplication in accordance with aspects of the present disclosure. The cross-base operations 300 may implement or be implemented by aspects of the computing environment 100 and the snapshot chain diagram 200, as described with reference to FIGS. 1 and 2. For example, a DMS (e.g., a DMS 110 as described with reference to FIG. 1) may generate multiple snapshot chains 305. Each of the multiple snapshot chains 305 may include a base snapshot ($F_x$) and one or more incremental snapshots ($I_{x,y}$) up to an nth incremental snapshot, where x is an index of a respective snapshot chain 305 and y is an index of a respective incremental snapshot. Each of the snapshot chains may be examples of the snapshot chains 205 as described with reference to FIG. 2, and the base snapshot and incremental snapshots may be examples of the snapshots 135 as described with reference to FIG. 1.

FIG. 3A shows an example of a first cross-base operation 300-$a$. In the first cross-base operation 300-$a$, the DMS may generate and store a snapshot chain 305-$d$ along with snapshot chains 305-$a$, 305-$b$, and 305-$c$ (e.g., snapshot chain 305-$d$ may appear in a storage environment of the snapshot chains 305). The DMS may have performed a cascade-cross operation for each of the snapshot chains 305-$a$, 305-$b$, and 305-$c$. For example, the DMS may have rewritten a base snapshot $F_2$ in the snapshot chain 305-$b$ as a cross-incremental snapshot $C_{2,1}$ over cross base $F_1$ and base snapshot $F_3$ in the snapshot chain 305-$c$ as a cross incremental snapshot $C_{3,1}$ over the cross-incremental snapshot $C_{2,1}$.

FIG. 3B shows an example of a second cross-base operation 300-$b$. In the second cross-base operation 300-$b$, the DMS may determine that base snapshot $F_4$ in the snapshot chain 305-$d$ should be the new cross base based on one or more parameters. For example, base snapshot $F_4$ may have an earlier expiration time relative to cross base $F_1$. Additionally, or alternatively, base snapshot $F_4$ may include more-similar data to cross base $F_1$ than the other cross-incremental snapshots. For example, 80% of the data in base snapshot $F_4$ may be shared by cross base $F_1$ compared to cross-incremental snapshot $C_{1,1}$ that may share 60% of its data with base snapshot $F_4$.

The DMS may write a cross-incremental snapshot 310 over $F_4$ based on determining that $F_4$ should be the new cross base. However, the DMS may not delete former cross base $F_1$ because cross-incremental snapshot $C_{2,1}$ may store a cross-reference to $F_1$. In some examples, the DMS may not adjust, update, or change, a reference to a snapshot (e.g., a base reference or cross-reference in a snapshot may be immutable). Accordingly, to update the cross-reference of cross-incremental snapshot $C_{2,1}$, the DMS may perform a cross re-base operation.

FIG. 3C shows an example of a third cross-base operation 300-$c$. In the third cross-base operation 300-$c$, the DMS may perform a cross re-base operation 315. A cross re-base operation may change metadata for a snapshot and may not move data stored in a snapshot. For example, the DMS may shift the cross-reference of $C_{2,1}$ from $F_1$ to cross-incremental snapshot $C_{1,1}$ based on rewriting the metadata for cross-incremental snapshot $C_{2,1}$. That is, the DMS may generate new patch and fingerprint files of cross-incremental snapshot $C_{2,1}$ that include a cross-reference to cross-incremental snapshot $C_{1,1}$ instead of $F_1$. The DMS may perform a cross re-base operation 315 for each incremental snapshot in each snapshot chain 305. For example, the DMS may generate patch files and fingerprint files for each of the incremental snapshots (e.g., incremental snapshot $I_{2,1}$, $I_{2,2}$, up to $I_{2,n}$) that include an updated cross (or base) reference to the previous snapshot in a respective snapshot chain 305 (e.g., snapshot chain 305-$b$).

Figure 4:
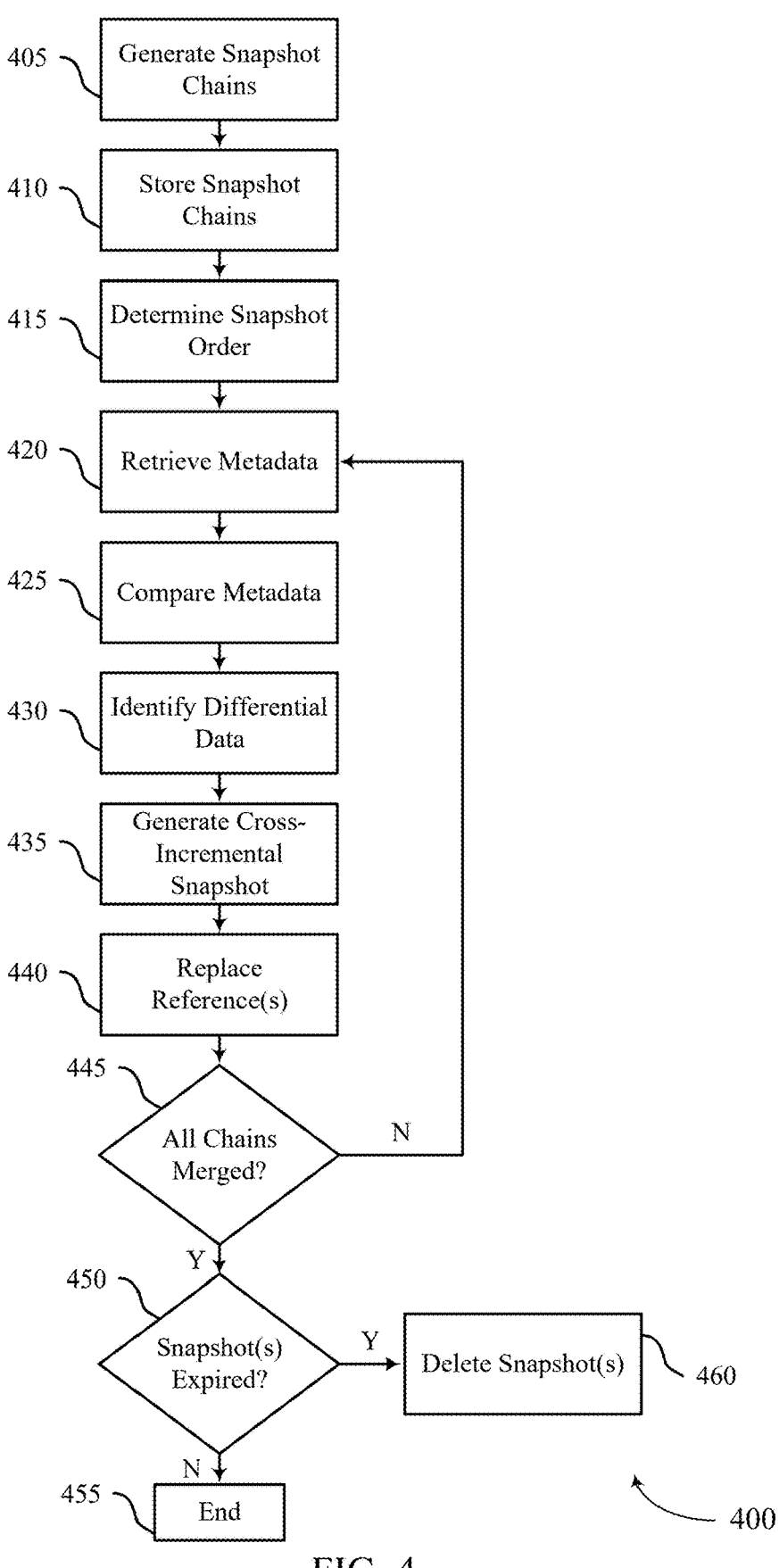
FIG. 4 shows an example of a process flow that supports cloud data rewrites using deduplication in accordance with aspects of the present disclosure.

FIG. 4 shows an example of a process flow 400 that supports cloud data rewrites using deduplication in accordance with aspects of the present disclosure. The process flow 400 may implement or be implemented by aspects of FIGS. 1-3. For example, the process flow 400 may be implemented by a DMS, such as the DMS 110 described with reference to FIG. 1. In some examples, the DMS may perform the operations in the process flow 400.

At 405, the DMS may generate multiple snapshot chains for a target computing object. Each snapshot chain of the multiple snapshot chains may include a respective base snapshot of the target computing object and multiple respective incremental snapshots of the target computing object. In some examples, a respective incremental snapshot of the multiple respective incremental snapshots in a snapshot chain may include respective differential data relative to a previous snapshot in the snapshot chain.

At 410, the DMS may store the multiple snapshot chains in a storage environment. In some examples, the multiple snapshot chains may correspond to a first quantity of storage space in the storage environment.

At 415, the DMS may determine an order of the multiple snapshot chains in accordance with one or more parameters. For example, a first position of a first snapshot chain in the order of the multiple snapshot chains may correspond to a first value of the one or more parameters associated with the first snapshot chain, and a position of a second snapshot chain in the order of the multiple snapshot chains may correspond to a second value of the one or more parameters associated with the second snapshot chain. In some examples, the order of the multiple snapshot chains may be in accordance with respective snapshot expiration times for each snapshot chain of the multiple snapshot chains. That is, the one or more parameters may include the respective snapshot chain expiration times. In such examples, the first value may be an earliest snapshot chain expiration time from among the respective snapshot chain expiration times and the second value may be a second-earliest snapshot chain expiration time from among the respective snapshot chain expiration times.

At 420, the DMS may retrieve, from the storage environment, first metadata corresponding to a first base snapshot of the first snapshot chain and second metadata corresponding to a second snapshot of the second snapshot chain.

At 425, the DMS may compare the first metadata with the second metadata. In some examples, the DMS may compare the first metadata and the second metadata based on retrieving the first metadata and the second metadata from the storage environment. Additionally, or alternatively, the DMS may compare the first metadata with the second metadata based on the position of the first snapshot chain and the position of the second snapshot chain in the order of the multiple snapshot chains.

At 430, the DMS may identify, based on comparing the first metadata with the second metadata, differential data included in the second snapshot relative to the first base snapshot. In some examples, the DMS may read, from the storage environment, one or more blocks corresponding to the differential data based on identifying the differential data. For example, the DMS (e.g., via a patch file service) may compare the fingerprint files of the second snapshot with the first base snapshot, and the DMS may obtain a list of changed block indices based on the comparison.

The DMS may initiate a first routine (e.g., via an Exo Task Runner) that may stream the list of changed block indices to a block index channel. The DMS (e.g., via the patch file service) may obtain a list of patch files and offsets (e.g., offsets corresponding to incremental snapshots) based on the block index channel and may read data for a given block offset. In some examples, the DMS may obtain the list of patch files and offsets via a read merged file application programming interface (API). The DMS may obtain n blocks from a single API call made to the read merged file API. In some examples, the DMS may obtain the n blocks using one or more second parameters (e.g., start offset, end offset, and page size) while adjusting for a last checked offset. The one or more second parameters may enable the DMS to use a read ahead cache in the single API call to reduce read latency. In some examples, the one or more second parameters may be based on a memory allocation size for the patch file service.

The DMS may initiate a second routine (e.g., via the Exo Task Runner) that streams the read data for the data blocks to a data block channel. The DMS may write the one or more blocks in third metadata corresponding to a cross-incremental snapshot that includes the differential data relative to the first base snapshot based on initiating a third routine. The third routine may write the data from the data block channel to a corresponding patch file.

At 435, the DMS may generate the cross-cross incremental snapshot. For example, the DMS may generate the cross-incremental snapshot based on writing the one or more blocks in the third metadata. The cross-incremental snapshot may replace the second snapshot in the second snapshot chain. In some examples, generating the cross-incremental snapshot that replaces the second snapshot within the multiple snapshot chains may result in the multiple snapshot chains occupying a second quantity of storage space in the storage environment that is less than the first quantity of storage space.

At 440, the DMS may replace, within fourth metadata corresponding to a first incremental snapshot of the second snapshot chain, a first reference to a second base snapshot of the second snapshot chain with a second reference to the cross-incremental snapshot based on generating the cross-incremental snapshot. In some examples, the second snapshot may be the second base snapshot.

At 445, the DMS may determine whether all snapshot chains have been merged to form a cross chain. If all of the snapshot chains have been merged, the DMS may continue to 450. If not, the DMS may return to 420 to retrieve the fourth metadata corresponding to the cross-incremental snapshot and fifth metadata corresponding to a third snapshot of a third snapshot chain in the multiple snapshot chains (e.g., the next snapshot chain in the order of snapshot chains). The DMS may continue the process flow for the third snapshot chain: comparing the fourth metadata with the fifth metadata, identifying second differential data included in the third snapshot relative to the incremental snapshot, generating a second cross-incremental snapshot that includes the second differential data and that replaces the third snapshot in the third snapshot chain, and replacing, within metadata for a first incremental snapshot of the third snapshot chain, a third reference to a third base snapshot of the third snapshot chain with a fourth reference to the second cross-incremental snapshot.

At 450, the DMS may determine whether any snapshot chain in the multiple snapshot chains are expired. If there are no expired snapshot chains, the DMS may continue to 455 to end the process flow 400. If there are one or more expired snapshot chains, the DMS may delete, at 460, from the storage environment, a first set of multiple incremental snapshots in the first snapshot chain based on an expiration of the first set of multiple incremental snapshots. In some examples, the DMS may retain the first base snapshot within the storage environment after deletion of the first set of multiple incremental snapshots in the first snapshot chain. Additionally, or alternatively, the DMS may delete, at 460, from the storage environment a second set of multiple incremental snapshots in the second snapshot chain based on an expiration of the second set of multiple incremental snapshots. A first incremental snapshot of the second set of multiple incremental snapshots may include second differential data relative to the cross-incremental snapshot. In some examples, the DMS may retain the cross-incremental snapshot within the storage environment after deletion of the second set of multiple incremental snapshots in the second snapshot chain.

Figure 5:
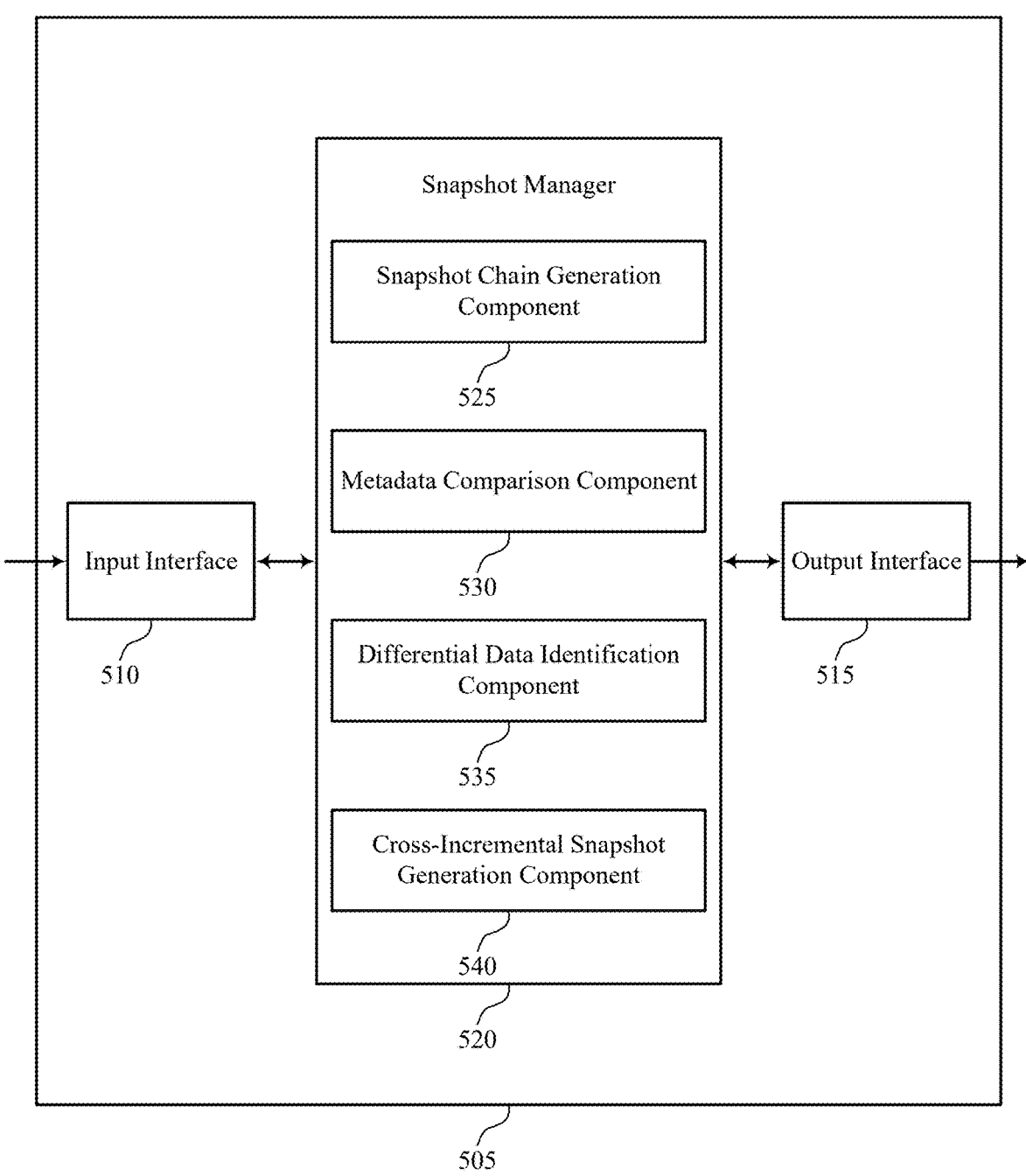
FIG. 5 shows a block diagram of an apparatus that supports cloud data rewrites using deduplication in accordance with aspects of the present disclosure.

FIG. 5 shows a block diagram 500 of a system 505 that supports cloud data rewrites using deduplication in accordance with aspects of the present disclosure. In some examples, the system 505 may be an example of aspects of one or more components described with reference to FIG. 1, such as a DMS 110. The system 505 may include an input interface 510, an output interface 515, and a snapshot manager 520. The system 505 may also include one or more processors. Each of these components may be in communication with one another (e.g., via one or more buses, communications links, communications interfaces, or any combination thereof).

The input interface 510 may manage input signaling for the system 505. For example, the input interface 510 may receive input signaling (e.g., messages, packets, data, instructions, commands, or any other form of encoded information) from other systems or devices. The input interface 510 may send signaling corresponding to (e.g., representative of or otherwise based on) such input signaling to other components of the system 505 for processing. For example, the input interface 510 may transmit such corresponding signaling to the snapshot manager 520 to support cloud data rewrites using deduplication. In some cases, the input interface 510 may be a component of a network interface 725 as described with reference to FIG. 7.

The output interface 515 may manage output signaling for the system 505. For example, the output interface 515 may receive signaling from other components of the system 505, such as the snapshot manager 520, and may transmit such output signaling corresponding to (e.g., representative of or otherwise based on) such signaling to other systems or devices. In some cases, the output interface 515 may be a component of a network interface 725 as described with reference to FIG. 7.

For example, the snapshot manager 520 may include a snapshot chain generation component 525, a metadata comparison component 530, a differential data identification component 535, a cross-incremental snapshot generation component 540, or any combination thereof. In some examples, the snapshot manager 520, or various components thereof, may be configured to perform various operations (e.g., receiving, monitoring, transmitting) using or otherwise in cooperation with the input interface 510, the output interface 515, or both. For example, the snapshot manager 520 may receive information from the input interface 510, send information to the output interface 515, or be integrated in combination with the input interface 510, the output interface 515, or both to receive information, transmit information, or perform various other operations as described herein.

The snapshot chain generation component 525 may be configured as or otherwise support a means for generating a set of multiple snapshot chains for a target computing object, each snapshot chain of the set of multiple snapshot chains including a respective base snapshot of the target computing object and a set of multiple respective incremental snapshots of the target computing object, where a respective incremental snapshot of the set of multiple respective incremental snapshots in a snapshot chain includes respective differential data relative to a previous snapshot in the snapshot chain. The metadata comparison component 530 may be configured as or otherwise support a means for comparing first metadata corresponding to a first base snapshot of a first snapshot chain of the set of multiple snapshot chains with second metadata corresponding to a second snapshot of a second snapshot chain of the set of multiple snapshot chains. The differential data identification component 535 may be configured as or otherwise support a means for identifying, based on comparing the first metadata with the second metadata, differential data included in the second snapshot relative to the first base snapshot. The cross-incremental snapshot generation component 540 may be configured as or otherwise support a means for generating a cross-incremental snapshot that includes the differential data relative to the first base snapshot, where the cross-incremental snapshot replaces the second snapshot in the second snapshot chain.

Figure 6:
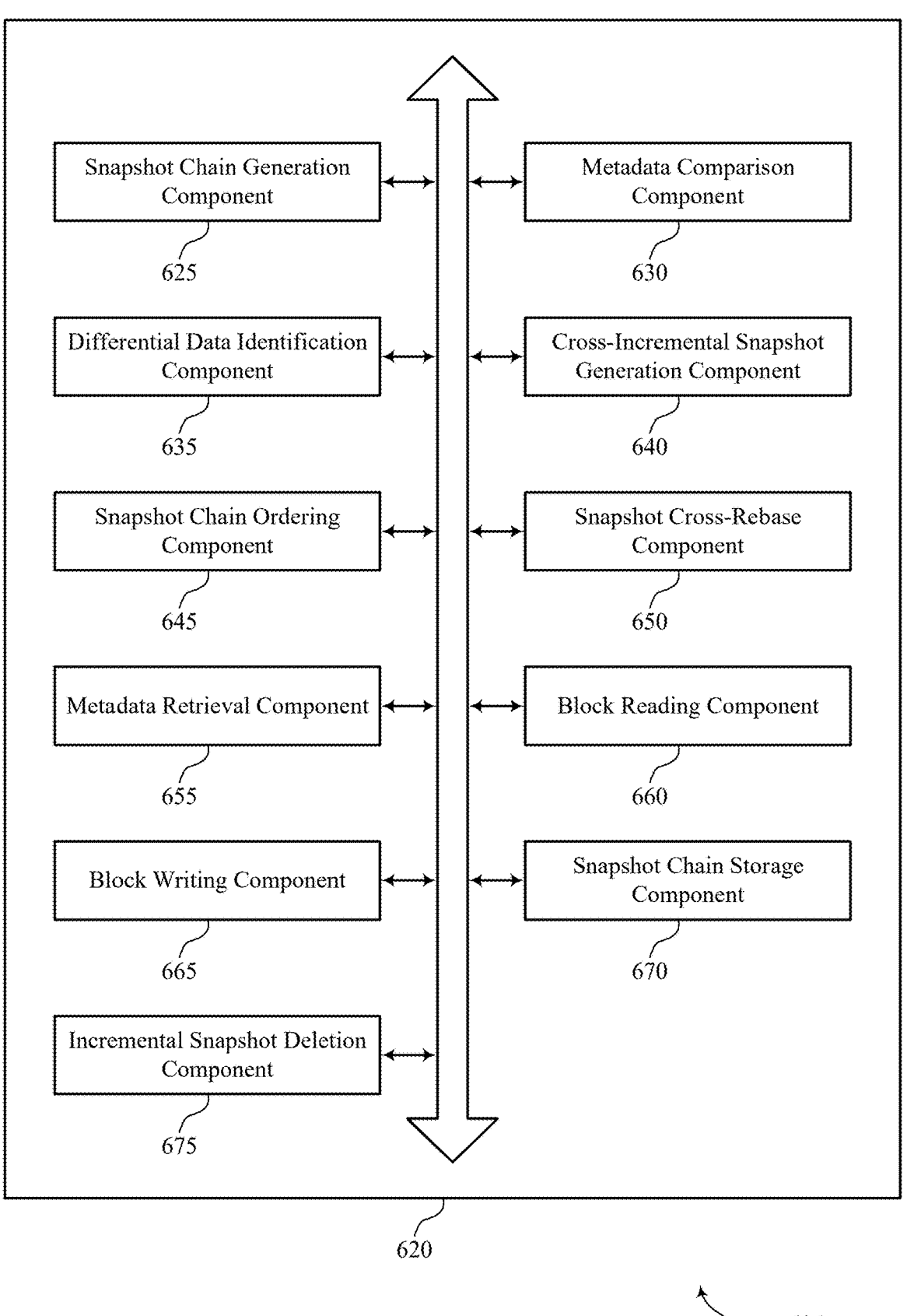
FIG. 6 shows a block diagram of a snapshot manager that supports cloud data rewrites using deduplication in accordance with aspects of the present disclosure.

FIG. 6 shows a block diagram 600 of a snapshot manager 620 that supports cloud data rewrites using deduplication in accordance with aspects of the present disclosure. The snapshot manager 620 may be an example of aspects of a snapshot manager or a snapshot manager 520, or both, as described herein. The snapshot manager 620, or various components thereof, may be an example of means for performing various aspects of cloud data rewrites using deduplication as described herein. For example, the snapshot manager 620 may include a snapshot chain generation component 625, a metadata comparison component 630, a differential data identification component 635, a cross-incremental snapshot generation component 640, a snapshot chain ordering component 645, a snapshot cross-rebase component 650, a metadata retrieval component 655, a block reading component 660, a block writing component 665, a snapshot chain storage component 670, an incremental snapshot deletion component 675, or any combination thereof. Each of these components, or components of subcomponents thereof (e.g., one or more processors, one or more memories), may communicate, directly or indirectly, with one another (e.g., via one or more buses, communications links, communications interfaces, or any combination thereof).

The snapshot chain generation component 625 may be configured as or otherwise support a means for generating a set of multiple snapshot chains for a target computing object, each snapshot chain of the set of multiple snapshot chains including a respective base snapshot of the target computing object and a set of multiple respective incremental snapshots of the target computing object, where a respective incremental snapshot of the set of multiple respective incremental snapshots in a snapshot chain includes respective differential data relative to a previous snapshot in the snapshot chain. The metadata comparison component 630 may be configured as or otherwise support a means for comparing first metadata corresponding to a first base snapshot of a first snapshot chain of the set of multiple snapshot chains with second metadata corresponding to a second snapshot of a second snapshot chain of the set of multiple snapshot chains. The differential data identification component 635 may be configured as or otherwise support a means for identifying, based on comparing the first metadata with the second metadata, differential data included in the second snapshot relative to the first base snapshot. The cross-incremental snapshot generation component 640 may be configured as or otherwise support a means for generating a cross-incremental snapshot that includes the differential data relative to the first base snapshot, where the cross-incremental snapshot replaces the second snapshot in the second snapshot chain.

In some examples, the snapshot chain ordering component 645 may be configured as or otherwise support a means for determining an order of the set of multiple snapshot chains in accordance with one or more parameters, where: a position of the first snapshot chain in the order of the set of multiple snapshot chains corresponds to a first value of the one or more parameters associated with the first snapshot chain, a position of the second snapshot chain in the order of the set of multiple snapshot chains corresponds to a second value of the one or more parameters associated with the second snapshot chain, and comparing the first metadata corresponding to the first base snapshot with the second metadata corresponding to the second snapshot is based on the position of the first snapshot chain and the position of the second snapshot chain.

In some examples, the order of the set of multiple snapshot chains is in accordance with respective snapshot chain expiration times for each snapshot chain of the set of multiple snapshot chains, the one or more parameters including the respective snapshot chain expiration times; the first value is an earliest snapshot chain expiration time from among the respective snapshot chain expiration times; and the second value is a second-earliest snapshot chain expiration time from among the respective snapshot chain expiration times.

In some examples, the snapshot cross-rebase component 650 may be configured as or otherwise support a means for replacing, within third metadata corresponding to a first incremental snapshot of the second snapshot chain, a first reference to a second base snapshot of the second snapshot chain with a second reference to the cross-incremental snapshot based on generating the cross-incremental snapshot.

In some examples, the metadata comparison component 630 may be configured as or otherwise support a means for comparing fourth metadata corresponding to the cross-incremental snapshot with fifth metadata corresponding to a third snapshot of a third snapshot chain of the set of multiple snapshot chains. In some examples, the differential data identification component 635 may be configured as or otherwise support a means for identifying, based on comparing the fourth metadata with the fifth metadata, second differential data included in the third snapshot relative to the cross-incremental snapshot. In some examples, the cross-incremental snapshot generation component 640 may be configured as or otherwise support a means for generating a second cross-incremental snapshot that includes the second differential data relative to the cross-incremental snapshot, where the second cross-incremental snapshot replaces the third snapshot in the third snapshot chain.

In some examples, the metadata retrieval component 655 may be configured as or otherwise support a means for retrieving, from a storage environment, the first metadata and the second metadata, where comparing the first metadata and the second metadata is based on retrieving the first metadata and the second metadata. In some examples, the block reading component 660 may be configured as or otherwise support a means for reading, from the storage environment, one or more blocks corresponding to the differential data based on identifying the differential data. In some examples, the block writing component 665 may be configured as or otherwise support a means for writing the one or more blocks in third metadata corresponding to the cross-incremental snapshot, where generating the cross-incremental snapshot is based on writing the one or more blocks.

In some examples, the snapshot chain storage component 670 may be configured as or otherwise support a means for storing the set of multiple snapshot chains in a storage environment, the set of multiple snapshot chains corresponding to a first quantity of storage space in the storage environment, where generating the cross-incremental snapshot that replaces the second snapshot within the set of multiple snapshot chains results in the set of multiple snapshot chains occupying a second quantity of storage space in the storage environment that is less than the first quantity.

In some examples, the incremental snapshot deletion component 675 may be configured as or otherwise support a means for deleting, from a storage environment, a first set of multiple incremental snapshots in the first snapshot chain based on an expiration of the first set of multiple incremental snapshots, where the first base snapshot is retained within the storage environment after deletion of the first set of multiple incremental snapshots in the first snapshot chain. In some examples, the incremental snapshot deletion component 675 may be configured as or otherwise support a means for deleting, from the storage environment, a second set of multiple incremental snapshots in the second snapshot chain based on an expiration of the second set of multiple incremental snapshots, where a first incremental snapshot of the second set of multiple incremental snapshots includes second differential data relative to the cross-incremental snapshot, and where the cross-incremental snapshot is retained within the storage environment after deletion of the second set of multiple incremental snapshots in the second snapshot chain.

Figure 7:
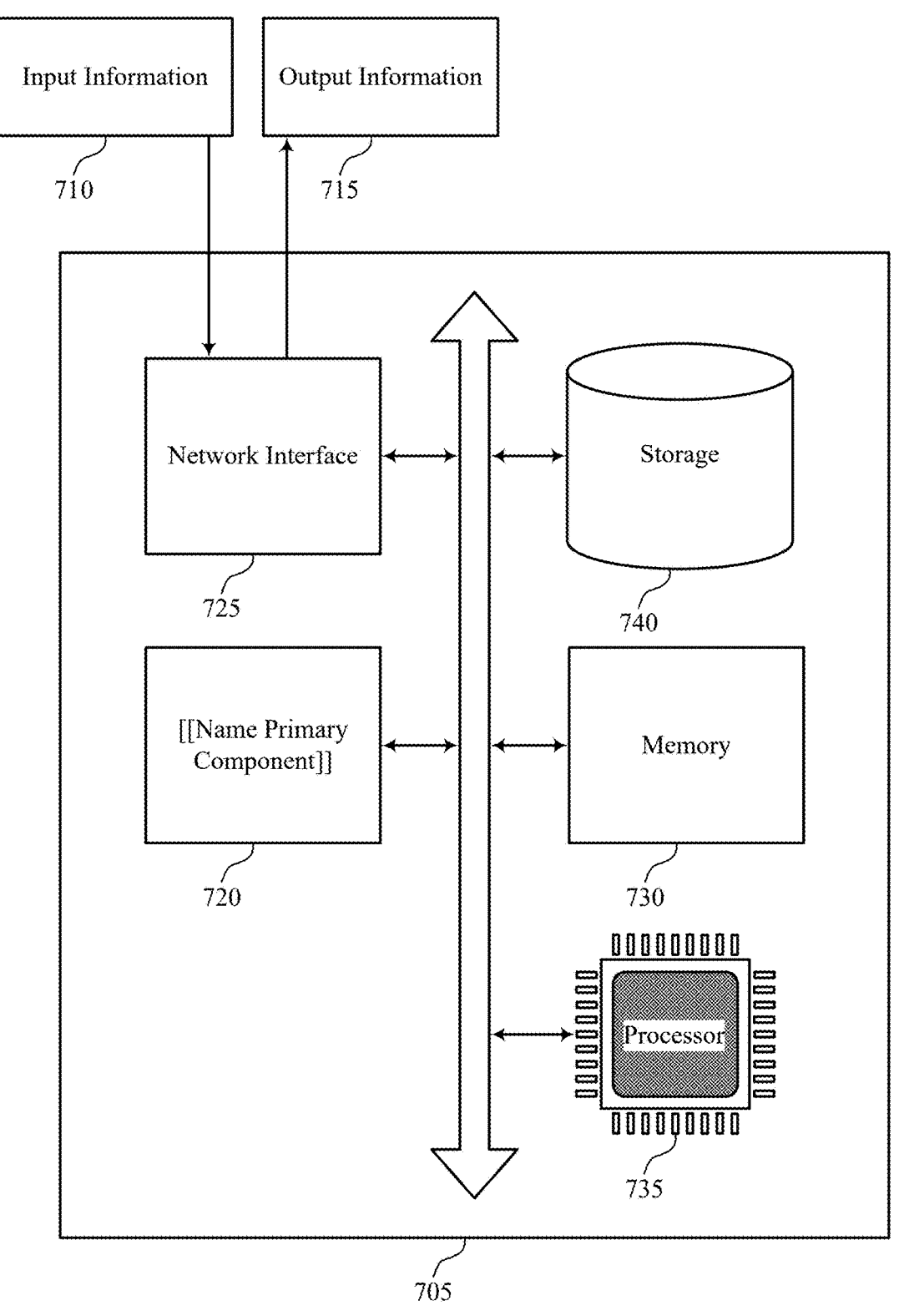
FIG. 7 shows a diagram of a system including a device that supports cloud data rewrites using deduplication in accordance with aspects of the present disclosure.

FIG. 7 shows a block diagram 700 of a system 705 that supports cloud data rewrites using deduplication in accordance with aspects of the present disclosure. The system 705 may be an example of or include components of a system 505 as described herein. The system 705 may include components for data management, including components such as a snapshot manager 720, an input information 710, an output information 715, a network interface 725, at least one memory 730, at least one processor 735, and a storage 740. These components may be in electronic communication or otherwise coupled with each other (e.g., operatively, communicatively, functionally, electronically, electrically; via one or more buses, communications links, communications interfaces, or any combination thereof). Additionally, the components of the system 705 may include corresponding physical components or may be implemented as corresponding virtual components (e.g., components of one or more virtual machines). In some examples, the system 705 may be an example of aspects of one or more components described with reference to FIG. 1, such as a DMS 110.

The network interface 725 may enable the system 705 to exchange information (e.g., input information 710, output information 715, or both) with other systems or devices (not shown). For example, the network interface 725 may enable the system 705 to connect to a network (e.g., a network 120 as described herein). The network interface 725 may include one or more wireless network interfaces, one or more wired network interfaces, or any combination thereof. In some examples, the network interface 725 may be an example of may be an example of aspects of one or more components described with reference to FIG. 1, such as one or more network interfaces 165.

Memory 730 may include RAM, ROM, or both. The memory 730 may store computer-readable, computer-executable software including instructions that, when executed, cause the processor 735 to perform various functions described herein. In some cases, the memory 730 may contain, among other things, a basic input/output system (BIOS), which may control basic hardware or software operation such as the interaction with peripheral components or devices. In some cases, the memory 730 may be an example of aspects of one or more components described with reference to FIG. 1, such as one or more memories 175.

The processor 735 may include an intelligent hardware device, (e.g., a general-purpose processor, a DSP, a CPU, a microcontroller, an ASIC, a field programmable gate array (FPGA), a programmable logic device, a discrete gate or transistor logic component, a discrete hardware component, or any combination thereof). The processor 735 may be configured to execute computer-readable instructions stored in a memory 730 to perform various functions (e.g., functions or tasks supporting cloud data rewrites using deduplication). Though a single processor 735 is depicted in the example of FIG. 7, it is to be understood that the system 705 may include any quantity of one or more of processors 735 and that a group of processors 735 may collectively perform one or more functions ascribed herein to a processor, such as the processor 735. In some cases, the processor 735 may be an example of aspects of one or more components described with reference to FIG. 1, such as one or more processors 170.

Storage 740 may be configured to store data that is generated, processed, stored, or otherwise used by the system 705. In some cases, the storage 740 may include one or more HDDs, one or more SDDs, or both. In some examples, the storage 740 may be an example of a single database, a distributed database, multiple distributed databases, a data store, a data lake, or an emergency backup database. In some examples, the storage 740 may be an example of one or more components described with reference to FIG. 1, such as one or more network disks 180.

For example, the snapshot manager 720 may be configured as or otherwise support a means for generating a set of multiple snapshot chains for a target computing object, each snapshot chain of the set of multiple snapshot chains including a respective base snapshot of the target computing object and a set of multiple respective incremental snapshots of the target computing object, where a respective incremental snapshot of the set of multiple respective incremental snapshots in a snapshot chain includes respective differential data relative to a previous snapshot in the snapshot chain. The snapshot manager 720 may be configured as or otherwise support a means for comparing first metadata corresponding to a first base snapshot of a first snapshot chain of the set of multiple snapshot chains with second metadata corresponding to a second snapshot of a second snapshot chain of the set of multiple snapshot chains. The snapshot manager 720 may be configured as or otherwise support a means for identifying, based at least in part on comparing the first metadata with the second metadata, differential data included in the second snapshot relative to the first base snapshot. The snapshot manager 720 may be configured as or otherwise support a means for generating a cross-incremental snapshot that includes the differential data relative to the first base snapshot, where the cross-incremental snapshot replaces the second snapshot in the second snapshot chain.

By including or configuring the snapshot manager 720 in accordance with examples as described herein, the system 705 may support techniques for cloud data rewrites using deduplication, which may provide one or more benefits such as, for example, reduced latency, more efficient utilization of computing resources, network resources or both, among other possibilities.

FIG. 8 shows a flowchart illustrating a method 800 that supports cloud data rewrites using deduplication in accordance with aspects of the present disclosure. The operations of the method 800 may be implemented by a DMS or its components as described herein. For example, the operations of the method 800 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 805, the method may include generating a set of multiple snapshot chains for a target computing object, each snapshot chain of the set of multiple snapshot chains including a respective base snapshot of the target computing object and a set of multiple respective incremental snapshots of the target computing object, where a respective incremental snapshot of the set of multiple respective incremental snapshots in a snapshot chain includes respective differential data relative to a previous snapshot in the snapshot chain. The operations of 805 may be performed in accordance with examples as disclosed herein. In some examples, aspects of the operations of 805 may be performed by a snapshot chain generation component 625 as described with reference to FIG. 6.

At 810, the method may include comparing first metadata corresponding to a first base snapshot of a first snapshot chain of the set of multiple snapshot chains with second metadata corresponding to a second snapshot of a second snapshot chain of the set of multiple snapshot chains. The operations of 810 may be performed in accordance with examples as disclosed herein. In some examples, aspects of the operations of 810 may be performed by a metadata comparison component 630 as described with reference to FIG. 6.

At 815, the method may include identifying, based on comparing the first metadata with the second metadata, differential data included in the second snapshot relative to the first base snapshot. The operations of 815 may be performed in accordance with examples as disclosed herein. In some examples, aspects of the operations of 815 may be performed by a differential data identification component 635 as described with reference to FIG. 6.

At 820, the method may include generating a cross-incremental snapshot that includes the differential data relative to the first base snapshot, where the cross-incremental snapshot replaces the second snapshot in the second snapshot chain. The operations of 820 may be performed in accordance with examples as disclosed herein. In some examples, aspects of the operations of 820 may be performed by a cross-incremental snapshot generation component 640 as described with reference to FIG. 6.

FIG. 9 shows a flowchart illustrating a method 900 that supports cloud data rewrites using deduplication in accordance with aspects of the present disclosure. The operations of the method 900 may be implemented by a DMS or its components as described herein. For example, the operations of the method 900 may be performed by a DMS as described with reference to FIGS. 1 through 7. In some examples, a DMS may execute a set of instructions to control the functional elements of the DMS to perform the described functions. Additionally, or alternatively, the DMS may perform aspects of the described functions using special-purpose hardware.

At 905, the method may include generating a set of multiple snapshot chains for a target computing object, each snapshot chain of the set of multiple snapshot chains including a respective base snapshot of the target computing object and a set of multiple respective incremental snapshots of the target computing object, where a respective incremental snapshot of the set of multiple respective incremental snapshots in a snapshot chain includes respective differential data relative to a previous snapshot in the snapshot chain. The operations of 905 may be performed in accordance with examples as disclosed herein. In some examples, aspects of the operations of 905 may be performed by a snapshot chain generation component 625 as described with reference to FIG. 6.

At 910, the method may include determining an order of the set of multiple snapshot chains in accordance with one or more parameters, where a position of the first snapshot chain in the order of the set of multiple snapshot chains corresponds to a first value of the one or more parameters associated with the first snapshot chain and a position of the second snapshot chain in the order of the set of multiple snapshot chains corresponds to a second value of the one or more parameters associated with the second snapshot chain. The operations of 910 may be performed in accordance with examples as disclosed herein. In some examples, aspects of the operations of 910 may be performed by a snapshot chain ordering component 645 as described with reference to FIG. 6.

At 915, the method may include comparing first metadata corresponding to a first base snapshot of a first snapshot chain of the set of multiple snapshot chains with second metadata corresponding to a second snapshot of a second snapshot chain of the set of multiple snapshot chains, where comparing the first metadata corresponding to the first base snapshot with the second metadata corresponding to the second snapshot is based on the position of the first snapshot chain and the position of the second snapshot chain. The operations of 915 may be performed in accordance with examples as disclosed herein. In some examples, aspects of the operations of 915 may be performed by a metadata comparison component 630 as described with reference to FIG. 6.

At 920, the method may include identifying, based on comparing the first metadata with the second metadata, differential data included in the second snapshot relative to the first base snapshot. The operations of 920 may be performed in accordance with examples as disclosed herein. In some examples, aspects of the operations of 920 may be performed by a differential data identification component 635 as described with reference to FIG. 6.

At 925, the method may include generating a cross-incremental snapshot that includes the differential data relative to the first base snapshot, where the cross-incremental snapshot replaces the second snapshot in the second snapshot chain. The operations of 925 may be performed in accordance with examples as disclosed herein. In some examples, aspects of the operations of 925 may be performed by a cross-incremental snapshot generation component 640 as described with reference to FIG. 6.

The following provides an overview of aspects of the present disclosure:

Aspect 1: A method, comprising: generating a plurality of snapshot chains for a target computing object, each snapshot chain of the plurality of snapshot chains comprising a respective base snapshot of the target computing object and a plurality of respective incremental snapshots of the target computing object, wherein a respective incremental snapshot of the plurality of respective incremental snapshots in a snapshot chain comprises respective differential data relative to a previous snapshot in the snapshot chain; comparing first metadata corresponding to a first base snapshot of a first snapshot chain of the plurality of snapshot chains with second metadata corresponding to a second snapshot of a second snapshot chain of the plurality of snapshot chains;

identifying, based at least in part on comparing the first metadata with the second metadata, differential data included in the second snapshot relative to the first base snapshot; and generating a cross-incremental snapshot that includes the differential data relative to the first base snapshot, wherein the cross-incremental snapshot replaces the second snapshot in the second snapshot chain.

Aspect 2: The method of aspect 1, further comprising: determining an order of the plurality of snapshot chains in accordance with one or more parameters, wherein: a position of the first snapshot chain in the order of the plurality of snapshot chains corresponds to a first value of the one or more parameters associated with the first snapshot chain, a position of the second snapshot chain in the order of the plurality of snapshot chains corresponds to a second value of the one or more parameters associated with the second snapshot chain, and comparing the first metadata corresponding to the first base snapshot with the second metadata corresponding to the second snapshot is based at least in part on the position of the first snapshot chain and the position of the second snapshot chain.

Aspect 3: The method of aspect 2, wherein the order of the plurality of snapshot chains is in accordance with respective snapshot chain expiration times for each snapshot chain of the plurality of snapshot chains, the one or more parameters comprising the respective snapshot chain expiration times; the first value is an earliest snapshot chain expiration time from among the respective snapshot chain expiration times; and the second value is a second-earliest snapshot chain expiration time from among the respective snapshot chain expiration times.

Aspect 4: The method of any of aspects 1 through 3, further comprising: replacing, within third metadata corresponding to a first incremental snapshot of the second snapshot chain, a first reference to a second base snapshot of the second snapshot chain with a second reference to the cross-incremental snapshot based at least in part on generating the cross-incremental snapshot.

Aspect 5: The method of any of aspects 1 through 4, further comprising: comparing fourth metadata corresponding to the cross-incremental snapshot with fifth metadata corresponding to a third snapshot of a third snapshot chain of the plurality of snapshot chains; identifying, based at least in part on comparing the fourth metadata with the fifth metadata, second differential data included in the third snapshot relative to the cross-incremental snapshot; and generating a second cross-incremental snapshot that includes the second differential data relative to the cross-incremental snapshot, wherein the second cross-incremental snapshot replaces the third snapshot in the third snapshot chain.

Aspect 6: The method of any of aspects 1 through 5, further comprising: retrieving, from a storage environment, the first metadata and the second metadata, wherein comparing the first metadata and the second metadata is based at least in part on retrieving the first metadata and the second metadata; reading, from the storage environment, one or more blocks corresponding to the differential data based at least in part on identifying the differential data; and writing the one or more blocks in third metadata corresponding to the cross-incremental snapshot, wherein generating the cross-incremental snapshot is based at least in part on writing the one or more blocks.

Aspect 7: The method of any of aspects 1 through 6, further comprising: storing the plurality of snapshot chains in a storage environment, the plurality of snapshot chains corresponding to a first quantity of storage space in the storage environment, wherein generating the cross-incremental snapshot that replaces the second snapshot within the plurality of snapshot chains results in the plurality of snapshot chains occupying a second quantity of storage space in the storage environment that is less than the first quantity.

Aspect 8: The method of any of aspects 1 through 7, further comprising: deleting, from a storage environment, a first plurality of incremental snapshots in the first snapshot chain based at least in part on an expiration of the first plurality of incremental snapshots, wherein the first base snapshot is retained within the storage environment after deletion of the first plurality of incremental snapshots in the first snapshot chain; and deleting, from the storage environment, a second plurality of incremental snapshots in the second snapshot chain based at least in part on an expiration of the second plurality of incremental snapshots, wherein a first incremental snapshot of the second plurality of incremental snapshots includes second differential data relative to the cross-incremental snapshot, and wherein the cross-incremental snapshot is retained within the storage environment after deletion of the second plurality of incremental snapshots in the second snapshot chain.

Aspect 9: An apparatus comprising one or more memories storing processor-executable code, and one or more processors coupled with the one or more memories and individually or collectively operable to execute the code to cause the apparatus to perform a method of any of aspects 1 through 8.

Aspect 10: An apparatus comprising at least one means for performing a method of any of aspects 1 through 8.

Aspect 11: A non-transitory computer-readable medium storing code the code comprising instructions executable by one or more processors to perform a method of any of aspects 1 through 8.

It should be noted that the methods described above describe possible implementations, and that the operations and the steps may be rearranged or otherwise modified and that other implementations are possible. Furthermore, aspects from two or more of the methods may be combined.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Further, a system as used herein may be a collection of devices, a single device, or aspects within a single device.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, EEPROM) compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, the article "a" before a noun is open-ended and understood to refer to "at least one" of those nouns or "one or more" of those nouns. Thus, the terms "a," "at least one," "one or more," and "at least one of one or more" may be interchangeable. For example, if a claim recites "a component" that performs one or more functions, each of the individual functions may be performed by a single component or by any combination of multiple components. Thus, "a component" having characteristics or performing functions may refer to "at least one of one or more components" having a particular characteristic or performing a particular function. Subsequent reference to a component introduced with the article "a" using the terms "the" or "said" refers to any or all of the one or more components. For example, a component introduced with the article "a" shall be understood to mean "one or more components," and referring to "the component" subsequently in the claims shall be understood to be equivalent to referring to "at least one of the one or more components."

Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein but is to be accorded the broadest scope consistent with the principles and novel features disclosed herein.

What is claimed is:

1. A method, comprising:
generating a plurality of snapshot chains for a target computing object, wherein:
each snapshot chain of the plurality of snapshot chains comprises a respective base snapshot of the target computing object and a plurality of respective incremental snapshots of the target computing object, wherein a respective incremental snapshot of the plurality of respective incremental snapshots in a snapshot chain comprises respective differential data relative to a previous snapshot in the snapshot chain,
a first snapshot chain within the plurality of snapshot chains includes a first base snapshot, and
a second snapshot chain within the plurality of snapshot chains includes a second snapshot, the second snapshot comprising shared data relative to the first base snapshot and further comprising differential data relative to the first base snapshot; and
generating a cross-incremental snapshot, wherein:
the cross-incremental snapshot includes the differential data from the second snapshot relative to the first base snapshot, and
the cross-incremental snapshot replaces the second snapshot in the second snapshot chain.
2. The method of claim 1, further comprising:
determining an order of the plurality of snapshot chains in accordance with one or more parameters, wherein:
a position of the first snapshot chain in the order of the plurality of snapshot chains corresponds to a first value of the one or more parameters associated with the first snapshot chain, and a position of the second snapshot chain in the order of the plurality of snapshot chains corresponds to a second value of the one or more parameters associated with the second snapshot chain.
3. The method of claim 2, wherein:
the order of the plurality of snapshot chains is in accordance with respective snapshot chain expiration times for each snapshot chain of the plurality of snapshot chains, the one or more parameters comprising the respective snapshot chain expiration times;
the first value is an earliest snapshot chain expiration time from among the respective snapshot chain expiration times; and
the second value is a second-earliest snapshot chain expiration time from among the respective snapshot chain expiration times.
4. The method of claim 1, further comprising:
replacing, within metadata corresponding to a first incremental snapshot of the second snapshot chain, a first reference to a second base snapshot of the second snapshot chain with a second reference to the cross-incremental snapshot based at least in part on generating the cross-incremental snapshot.
5. The method of claim 1, further comprising:
generating a second cross-incremental snapshot that includes second differential data from a third snapshot of a third snapshot chain of the plurality of snapshot chains relative to the cross-incremental snapshot, wherein the second cross-incremental snapshot replaces the third snapshot in the third snapshot chain.
6. The method of claim 1, further comprising:
reading, from a storage environment, one or more blocks corresponding to the differential data based at least in part on the differential data; and
writing the one or more blocks in metadata corresponding to the cross-incremental snapshot, wherein generating the cross-incremental snapshot is based at least in part on writing the one or more blocks.
7. The method of claim 1, further comprising:
storing the plurality of snapshot chains in a storage environment, the plurality of snapshot chains corresponding to a first quantity of storage space in the storage environment, wherein generating the cross-incremental snapshot that replaces the second snapshot within the plurality of snapshot chains results in the plurality of snapshot chains occupying a second quantity of storage space in the storage environment that is less than the first quantity.
8. The method of claim 1, further comprising:
deleting, from a storage environment, a first plurality of incremental snapshots in the first snapshot chain based at least in part on an expiration of the first plurality of incremental snapshots, wherein the first base snapshot is retained within the storage environment after deletion of the first plurality of incremental snapshots in the first snapshot chain; and
deleting, from the storage environment, a second plurality of incremental snapshots in the second snapshot chain based at least in part on an expiration of the second plurality of incremental snapshots, wherein a first incremental snapshot of the second plurality of incremental snapshots includes second differential data relative to the cross-incremental snapshot, and wherein the cross-incremental snapshot is retained within the storage environment after deletion of the second plurality of incremental snapshots in the second snapshot chain.

9. An apparatus, comprising:

one or more memories storing processor-executable code; and one or more processors coupled with the one or more memories and individually or collectively operable to execute the code to cause the apparatus to:

generate a plurality of snapshot chains for a target computing object, wherein:

each snapshot chain of the plurality of snapshot chains comprises a respective base snapshot of the target computing object and a plurality of respective incremental snapshots of the target computing object, wherein a respective incremental snapshot of the plurality of respective incremental snapshots in a snapshot chain comprises respective differential data relative to a previous snapshot in the snapshot chain, a first snapshot chain within the plurality of snapshot chains includes a first base snapshot, and a second snapshot chain within the plurality of snapshot chains includes a second snapshot, the second snapshot comprising shared data relative to the first base snapshot and further comprising differential data relative to the first base snapshot; and generate a cross-incremental snapshot, wherein:

the cross-incremental snapshot includes the differential data from the second snapshot relative to the first base snapshot, and the cross-incremental snapshot replaces the second snapshot in the second snapshot chain.

10. The apparatus of claim 9, wherein the one or more processors are individually or collectively further operable to execute the code to cause the apparatus to:

determine an order of the plurality of snapshot chains in accordance with one or more parameters, wherein:

a position of the first snapshot chain in the order of the plurality of snapshot chains corresponds to a first value of the one or more parameters associated with the first snapshot chain, and a position of the second snapshot chain in the order of the plurality of snapshot chains corresponds to a second value of the one or more parameters associated with the second snapshot chain.

11. The apparatus of claim 10, wherein:

the order of the plurality of snapshot chains is in accordance with respective snapshot chain expiration times for each snapshot chain of the plurality of snapshot chains, the one or more parameters comprising the respective snapshot chain expiration times;

the first value is an earliest snapshot chain expiration time from among the respective snapshot chain expiration times; and the second value is a second-earliest snapshot chain expiration time from among the respective snapshot chain expiration times.

12. The apparatus of claim 9, wherein the one or more processors are individually or collectively further operable to execute the code to cause the apparatus to:

replace, within metadata corresponding to a first incremental snapshot of the second snapshot chain, a first reference to a second base snapshot of the second snapshot chain with a second reference to the cross-incremental snapshot based at least in part on generating the cross-incremental snapshot.

13. The apparatus of claim 9, wherein the one or more processors are individually or collectively further operable to execute the code to cause the apparatus to:

generate a second cross-incremental snapshot that includes second differential data from a third snapshot of a third snapshot chain of the plurality of snapshot chains relative to the cross-incremental snapshot, wherein the second cross-incremental snapshot replaces the third snapshot in the third snapshot chain.

14. The apparatus of claim 9, wherein the one or more processors are individually or collectively further operable to execute the code to cause the apparatus to:

read, from a storage environment, one or more blocks corresponding to the differential data based at least in part on the differential data; and write the one or more blocks in metadata corresponding to the cross-incremental snapshot, wherein generating the cross-incremental snapshot is based at least in part on writing the one or more blocks.

15. The apparatus of claim 9, wherein the one or more processors are individually or collectively further operable to execute the code to cause the apparatus to:

store the plurality of snapshot chains in a storage environment, the plurality of snapshot chains corresponding to a first quantity of storage space in the storage environment, wherein the cross-incremental snapshot that replaces the second snapshot within the plurality of snapshot chains is configured to result in the plurality of snapshot chains occupying a second quantity of storage space in the storage environment that is less than the first quantity.

16. The apparatus of claim 9, wherein the one or more processors are individually or collectively further operable to execute the code to cause the apparatus to:

delete, from a storage environment, a first plurality of incremental snapshots in the first snapshot chain based at least in part on an expiration of the first plurality of incremental snapshots, wherein the one or more processors are individually or collectively operable to execute the code to cause the apparatus to retain the first base snapshot within the storage environment after deletion of the first plurality of incremental snapshots in the first snapshot chain; and delete, from the storage environment, a second plurality of incremental snapshots in the second snapshot chain based at least in part on an expiration of the second plurality of incremental snapshots, wherein a first incremental snapshot of the second plurality of incremental snapshots includes second differential data relative to the cross-incremental snapshot, and wherein the one or more processors are individually or collectively operable to execute the code to cause the apparatus to retain the cross-incremental snapshot within the storage environment after deletion of the second plurality of incremental snapshots in the second snapshot chain.

17. A non-transitory computer-readable medium storing code, the code comprising instructions executable by one or more processors to:

generate a plurality of snapshot chains for a target computing object, wherein:

each snapshot chain of the plurality of snapshot chains comprises a respective base snapshot of the target computing object and a plurality of respective incremental snapshots of the target computing object, wherein a respective incremental snapshot of the plurality of respective incremental snapshots in a snapshot chain comprises respective differential data relative to a previous snapshot in the snapshot chain, a first snapshot chain within the plurality of snapshot chains includes a first base snapshot, and a second snapshot chain of the plurality of snapshot chains includes a second snapshot, the second snapshot comprising shared data relative to the first base snapshot and further comprising differential data relative to the first base snapshot; and generate a cross-incremental snapshot, wherein:

the cross-incremental snapshot includes the differential data from the second snapshot relative to the first base snapshot, and the cross-incremental snapshot replaces the second snapshot in the second snapshot chain.

18. The non-transitory computer-readable medium of claim 17, wherein the instructions are further executable by the one or more processors to:

determine an order of the plurality of snapshot chains in accordance with one or more parameters, wherein:

a position of the first snapshot chain in the order of the plurality of snapshot chains corresponds to a first value of the one or more parameters associated with the first snapshot chain, and a position of the second snapshot chain in the order of the plurality of snapshot chains corresponds to a second value of the one or more parameters associated with the second snapshot chain.

19. The non-transitory computer-readable medium of claim 17, wherein the instructions are further executable by the one or more processors to:

replace, within metadata corresponding to a first incremental snapshot of the second snapshot chain, a first reference to a second base snapshot of the second snapshot chain with a second reference to the cross-incremental snapshot based at least in part on generating the cross-incremental snapshot.

20. The non-transitory computer-readable medium of claim 17, wherein the instructions are further executable by the one or more processors to:

generate a second cross-incremental snapshot that includes second differential data from a third snapshot of a third snapshot chain of the plurality of snapshot chains relative to the cross-incremental snapshot, wherein the second cross-incremental snapshot replaces the third snapshot in the third snapshot chain.

* * * * *